US010472012B2

(12) United States Patent
Shirai

(10) Patent No.: US 10,472,012 B2
(45) Date of Patent: Nov. 12, 2019

(54) BICYCLE SEATPOST ASSEMBLY

(71) Applicant: SHIMANO INC., Sakai (JP)

(72) Inventor: Toyoto Shirai, Sakai (JP)

(73) Assignee: SHIMANO INC., Sakai (JP)

( * ) Notice: Subject to any disclaimer, the term of this patent is extended or adjusted under 35 U.S.C. 154(b) by 924 days.

(21) Appl. No.: 15/016,413

(22) Filed: Feb. 5, 2016

(65) Prior Publication Data

US 2017/0225734 A1   Aug. 10, 2017

(51) Int. Cl.
*B62J 1/08*       (2006.01)
*B62J 1/28*       (2006.01)
B62J 99/00     (2009.01)

(52) U.S. Cl.
CPC . *B62J 1/08* (2013.01); *B62J 1/28* (2013.01); *B62J 2001/085* (2013.01); *B62J 2099/004* (2013.01)

(58) Field of Classification Search
CPC .......... B62J 1/08; B62J 1/10; B62J 2001/085; B62K 23/02; A47C 3/20; A47C 7/008
See application file for complete search history.

(56) References Cited

U.S. PATENT DOCUMENTS

| | | | | |
|---|---|---|---|---|
| 5,048,891 A * | 9/1991 | Yach | ........................... | B62J 1/04 297/215.14 |
| 5,295,727 A * | 3/1994 | Kao | ........................... | B62J 1/08 248/180.1 |
| 6,174,027 B1 * | 1/2001 | Lemmens | ................... | B62J 1/00 297/215.13 |
| 8,454,086 B2 * | 6/2013 | Kim | ........................ | B62K 19/36 297/209 |
| 2005/0200170 A1 * | 9/2005 | Liao | ........................... | B62J 1/08 297/215.15 |
| 2011/0204201 A1 | 8/2011 | Kodama et al. | | |
| 2011/0254328 A1 * | 10/2011 | Sloan | ........................ | B62J 1/08 297/215.14 |
| 2015/0034779 A1 * | 2/2015 | McAndrews | .............. | B62J 1/08 248/125.8 |
| 2015/0232142 A1 | 8/2015 | Shirai | | |
| 2015/0239517 A1 | 8/2015 | Shirai | | |
| 2016/0075389 A1 * | 3/2016 | Ahnert | ..................... | B62J 1/065 297/311 |
| 2017/0225732 A1 * | 8/2017 | Hsu | ............................. | B62J 1/08 |
| 2018/0334212 A1 * | 11/2018 | Bowers | ..................... | B62J 1/04 |

FOREIGN PATENT DOCUMENTS

| | | |
|---|---|---|
| CN | 102161358 | 8/2011 |
| DE | 10 2015 210 260 | 12/2015 |
| TW | 201129486 | 9/2011 |
| TW | 201545930 | 12/2015 |

* cited by examiner

*Primary Examiner* — Daniel J Wiley
(74) *Attorney, Agent, or Firm* — Mori & Ward, LLP

(57) ABSTRACT

A bicycle seatpost assembly comprises a first tube, a second tube, and a positioning structure to relatively position the first tube and the second tube. The positioning structure is mounted to at least one of the first tube and the second tube and is configured to change a state of the bicycle seatpost assembly among a first adjustable state in which the second tube is retracted or extended relative to the first tube at a first speed in response to a reference force applied to the second tube, and a second adjustable state in which the second tube is retracted or extended relative to the first tube at a second speed in response to the reference force applied to the second tube. The second speed is lower than the first speed.

20 Claims, 17 Drawing Sheets

BICYCLE SEATPOST ASSEMBLY

BACKGROUND OF THE INVENTION

Field of the Invention

The present invention relates to a bicycle actuation structure and a bicycle seatpost assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a seatpost.

SUMMARY OF THE INVENTION

In accordance with a first aspect of the present invention, a bicycle seatpost assembly comprises a first tube and a second tube. The second tube is mounted to the first tube to be retracted and extended relative to the first tube in a telescopic direction. The bicycle seatpost assembly comprises a positioning structure to relatively position the first tube and the second tube. The positioning structure is mounted to at least one of the first tube and the second tube and is configured to change a state of the bicycle seatpost assembly among a first adjustable state in which the second tube is retracted or extended relative to the first tube at a first speed in response to a reference force applied to the second tube, and a second adjustable state in which the second tube is retracted or extended relative to the first tube at a second speed in response to the reference force applied to the second tube. The second speed is lower than the first speed.

With the bicycle seatpost assembly according to the first aspect, it is possible to change the speed of the second tube in accordance with the state of the bicycle seatpost assembly, making it easier to adjust a position of the second tube relative to the first tube. Furthermore, since the first speed is higher than the second speed, the second tube can be rapidly retracted or extended relative to the first tube in the first adjustable state.

In accordance with a second aspect of the present invention, the bicycle seatpost assembly according to the first aspect is configured so that the positioning structure includes a first chamber, a second chamber, a first passageway to connect the first chamber to the second chamber in the first adjustable state, and a second passageway to connect the first chamber to the second chamber in the second adjustable state.

With the bicycle seatpost assembly according to the second aspect, it is possible to utilize the first passageway and the second passageway to change the state of the bicycle seatpost assembly.

In accordance with a third aspect of the present invention, the bicycle seatpost assembly according to the second aspect is configured so that the positioning structure closes the first passageway in the second adjustable state.

With the bicycle seatpost assembly according to the third aspect, it is possible to change the state of the bicycle seatpost assembly to the second adjustable state by closing the first passageway.

In accordance with a fourth aspect of the present invention, the bicycle seatpost assembly according to the second or third aspect is configured so that the positioning structure opens the second passageway in the first adjustable state.

With the bicycle seatpost assembly according to the fourth aspect, it is possible to change the state of the bicycle seatpost assembly to the first adjustable state by opening the second passageway.

In accordance with a fifth aspect of the present invention, the bicycle seatpost assembly according to any one of the second to fourth aspects is configured so that the first passageway has a first minimum cross-sectional area in the first adjustable state. The second passageway has a second minimum cross-sectional area in the second adjustable state. The second minimum cross-sectional area is smaller than the first minimum cross-sectional area.

With the bicycle seatpost assembly according to the fifth aspect, it is possible to change the speed of the second tube by switching the first passageway and the second passageway.

In accordance with a sixth aspect of the present invention, the bicycle seatpost assembly according to the fifth aspect is configured so that the positioning structure includes a changing device to change the second minimum cross-sectional area of the second passageway between an extension minimum cross-sectional area and a retraction minimum cross-sectional area in accordance with a direction of fluid flowing in the second passageway. The extension minimum cross-sectional area is different from the retraction minimum cross-sectional area.

With the bicycle seatpost assembly according to the sixth aspect, it is possible to change the speed of the second tube in accordance with the direction of movement of the second tube relative to the first tube.

In accordance with a seventh aspect of the present invention, the bicycle seatpost assembly according to the sixth aspect is configured so that the changing device changes the second minimum cross-sectional area of the second passageway to the retraction minimum cross-sectional area in the second adjustable state when the second tube is retracted relative to the first tube. The changing device changes the second minimum cross-sectional area of the second passageway to the extension minimum cross-sectional area in the second adjustable state when the second tube is extended relative to the first tube. The retraction minimum cross-sectional area is smaller than the extension minimum cross-sectional area.

With the bicycle seatpost assembly according to the seventh aspect, it is possible to make the speed of the second tube lower when the second tube is retracted relative to the first tube than when the second tube is extended relative to the first tube.

In accordance with an eighth aspect of the present invention, the bicycle seatpost assembly according to the sixth or seventh aspect is configured so that the changing device includes a support member and a valve element. The valve element is movable relative to the support member in the telescopic direction between a first position and a second position in response to the direction of fluid flowing in the second passageway. The support member and the valve element defines the extension minimum cross-sectional area in a state where the valve element is positioned at the first position relative to the support member. The support member and the valve element defines the retraction minimum cross-sectional area in a state where the valve element is positioned at the second position relative to the support member.

With the bicycle seatpost assembly according to the eighth aspect, it is possible to change the state of the bicycle seatpost assembly with a simple structure such as the valve element.

In accordance with a ninth aspect of the present invention, the bicycle seatpost assembly according to any one of the first to eighth aspects is configured so that the positioning structure includes a control member movable relative to the second tube in the telescopic direction between a first open position and a second open position. The positioning structure is in the first adjustable state in a first open state where the control member is positioned at the first open position. The positioning structure is in the second adjustable state in a second open state where the control member is positioned at the second open position.

With the bicycle seatpost assembly according to the ninth aspect, it is possible to change the state of the bicycle seatpost assembly with a simple structure such as the control member.

In accordance with a tenth aspect of the present invention, the bicycle seatpost assembly according to the ninth aspect is configured so that the positioning structure includes a first gate and a second gate. The first gate is provided on the first passageway. The first gate has a first closed state and a first open state. The second gate is provided on the second passageway. The second gate has a second closed state and a second open state. The positioning structure changes a state of the first gate between the first closed state and the first open state in response to a position of the control member relative to the second tube. The positioning structure changes a state of the second gate between the second closed state and the second open state in response to the position of the control member relative to the second tube.

With the bicycle seatpost assembly according to the tenth aspect, it is possible to change the state of the bicycle seatpost assembly with a simple structure such as the control member.

In accordance with an eleventh aspect of the present invention, the bicycle seatpost assembly according to the ninth or tenth aspect is configured so that the control member is movably mounted to the second tube to move relative to the second tube in the telescopic direction in response to an amount of operation of a control cable.

With the bicycle seatpost assembly according to the eleventh aspect, it is possible to change the state of the bicycle seatpost assembly with a simple structure such as the control member.

In accordance with a twelfth aspect of the present invention, the bicycle seatpost assembly according to any one of the ninth to eleventh aspects further comprises a motor to move the control member relative to the second tube in the telescopic direction.

With the bicycle seatpost assembly according to the twelfth aspect, it is possible to change the state of the bicycle seatpost assembly using electric power.

In accordance with a thirteenth aspect of the present invention, the bicycle seatpost assembly according to the twelfth aspect further comprises a wireless communication device to receive a wireless signal and a motor controller to control the motor in response to the wireless signal.

With the bicycle seatpost assembly according to the thirteenth aspect, it is possible to change the state of the bicycle seatpost assembly using wireless technology.

In accordance with a fourteenth aspect of the present invention, the bicycle seatpost assembly according to any one of the first to thirteenth aspects is configured so that the first tube and the second tube are relatively movable in the first adjustable state within a first adjustable range. The first tube and the second tube are relatively movable in the second adjustable state within a second adjustable range equal to the first adjustable range.

With the bicycle seatpost assembly according to the fourteenth aspect, it is possible to change the state of the bicycle seatpost assembly within the same adjustable range in the first adjustable state and the second adjustable state.

In accordance with a fifteenth aspect of the present invention, a bicycle seatpost assembly comprises a first tube and a second tube. The second tube is mounted to the first tube to be retracted and extended relative to the first tube in a telescopic direction. The bicycle seatpost assembly comprises a positioning structure to relatively position the first tube and the second tube. The positioning structure includes a first chamber and a second chamber. The positioning structure is mounted to at least one of the first tube and the second tube and is configured to change a state of the bicycle seatpost assembly among a first adjustable state in which the first chamber is connected to the second chamber via a first passageway having a first minimum cross-sectional area, and a second adjustable state in which the first chamber is connected to the second chamber via a second passageway having a second minimum cross-sectional area that is smaller than the first minimum cross-sectional area.

With the bicycle seatpost assembly according to the fifteenth aspect, it is possible to change the cross-sectional area of a passageway in accordance with the state of the bicycle seatpost assembly. Thus, it is possible to change a speed of the second tube in accordance with the state of the bicycle seatpost assembly, making it easier to adjust a position of the second tube relative to the first tube.

In accordance with a sixteenth aspect of the present invention, the bicycle seatpost assembly according to the fifteenth aspect is configured so that the positioning structure includes a changing device to change the second minimum cross-sectional area of the second passageway between an extension minimum cross-sectional area and a retraction minimum cross-sectional area in accordance with a direction of fluid flowing in the second passageway. The extension minimum cross-sectional area is different from the retraction minimum cross-sectional area.

With the bicycle seatpost assembly according to the sixteenth aspect, it is possible to change the speed of the second tube in accordance with the direction of movement of the second tube relative to the first tube.

In accordance with a seventeenth aspect of the present invention, the bicycle seatpost assembly according to the sixteenth aspect is configured so that the changing device changes the second minimum cross-sectional area of the second passageway to the retraction minimum cross-sectional area in the second adjustable state when the second tube is retracted relative to the first tube. The changing device changes the second minimum cross-sectional area of the second passageway to the extension minimum cross-sectional area in the second adjustable state when the second tube is extended relative to the first tube. The retraction minimum cross-sectional area is smaller than the extension minimum cross-sectional area.

With the bicycle seatpost assembly according to the seventeenth aspect, it is possible to make the speed of the second tube lower when the second tube is retracted relative to the first tube than when the second tube is extended relative to the first tube.

In accordance with an eighteenth aspect of the present invention, the bicycle seatpost assembly according to the sixteenth or seventeenth aspect is configured so that the changing device includes a support member and a valve element. The valve element is movable relative to the support member in the telescopic direction between a first position and a second position in response to the direction of fluid flowing in the second passageway. The support member and the valve element defines the extension minimum cross-sectional area in a state where the valve element is positioned at the first position relative to the support member. The support member and the valve element defines the retraction minimum cross-sectional area in a state where the valve element is positioned at the second position relative to the support member.

With the bicycle seatpost assembly according to the eighteenth aspect, it is possible to change the state of the bicycle seatpost assembly with a simple structure such as the valve element.

In accordance with a nineteenth aspect of the present invention, a bicycle seatpost assembly comprises a first tube and a second tube. The second tube is mounted to the first tube to be retracted and extended relative to the first tube in a telescopic direction. The bicycle seatpost assembly comprises a positioning structure to relatively position the first tube and the second tube. The positioning structure includes a first chamber, a second chamber, a fluid passageway to connect the first chamber to the second chamber, and a changing device provided on the fluid passageway to change a minimum cross-sectional area of the fluid passageway between a retraction minimum cross-sectional area of when the second tube is retracted relative to the first tube, and an extension minimum cross-sectional area of when the second tube is extended relative to the first tube, the extension minimum cross-sectional area being different from the retraction minimum cross-sectional area.

With the bicycle seatpost assembly according to the nineteenth aspect, it is possible to change the cross-sectional area of the fluid passageway in accordance with a relative position defined between the first tube and the second tube. Thus, it is possible to change a speed of the second tube in accordance with the state of the bicycle seatpost assembly, making it easier to adjust a position of the second tube relative to the first tube.

In accordance with a twentieth aspect of the present invention, the bicycle seatpost assembly according to the nineteenth aspect is configured so that the retraction minimum cross-sectional area is smaller than the extension minimum cross-sectional area.

With the bicycle seatpost assembly according to the twentieth aspect, it is possible to make the speed of the second tube lower when the second tube is retracted relative to the first tube than when the second tube is extended relative to the first tube.

In accordance with a twenty-first aspect of the present invention, the bicycle seatpost assembly according to the nineteenth or twentieth aspect is configured so that the changing device includes a support member and a valve element. The valve element is movable relative to the support member in the telescopic direction between a first position and a second position in response to the direction of fluid flowing in the second passageway. The support member and the valve element defines the extension minimum cross-sectional area in a state where the valve element is positioned at the first position relative to the support member. The support member and the valve element defines the retraction minimum cross-sectional area in a state where the valve element is positioned at the second position relative to the support member.

With the bicycle seatpost assembly according to the twenty-first aspect, it is possible to change the state of the bicycle seatpost assembly with a simple structure such as the valve element.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
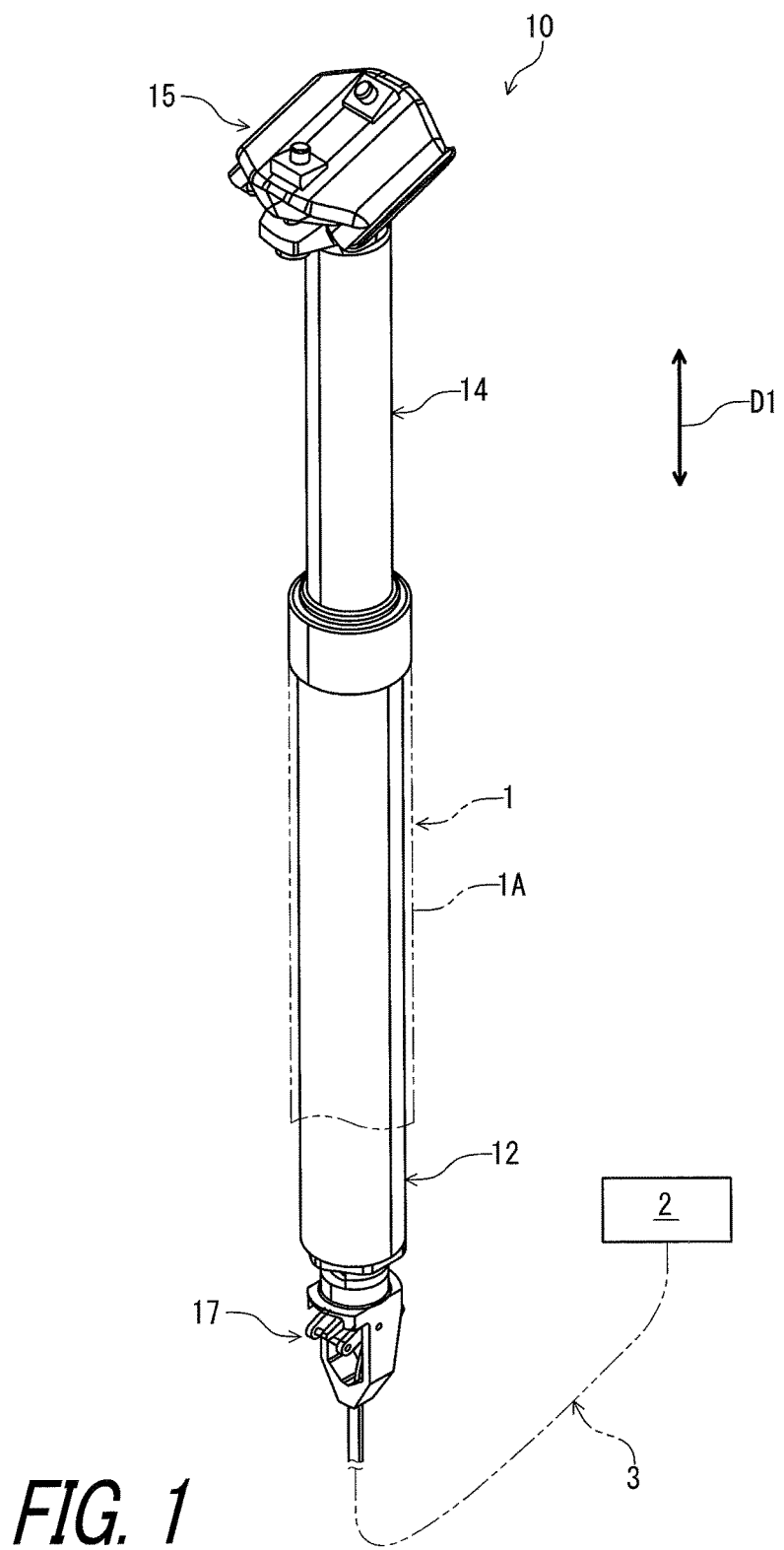
FIG. 1 is a perspective view of a bicycle seatpost assembly in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle seatpost assembly 10 in accordance with a first embodiment comprises a first tube 12 and a second tube 14. The second tube 14 is mounted to the first tube 12 to be retracted and extended relative to the first tube 12 in a telescopic direction D1. The first tube 12 is detachably attached to a seat tube 1A of a frame 1. The bicycle seatpost assembly 10 comprises a mounting structure 15 configured to fixedly mount a bicycle saddle (not shown) to the second tube 14. The mounting structure 15 is attached to an upper end of the second tube 14.

In the present application, the following directional terms "forward", "rearward", "left", "right", "upward" and "downward" as well as any other similar directional textus refer to those directions which are determined on the basis of the rider who sits on the bicycle saddle (not shown) of a bicycle with facing a bicycle handlebar (not shown). Accordingly, these terms, as utilized to describe the bicycle seatpost assembly 10, should be interpreted relative to a bicycle equipped with the bicycle seatpost assembly 10 as used in an upright riding position on a horizontal surface.

Figure 2:
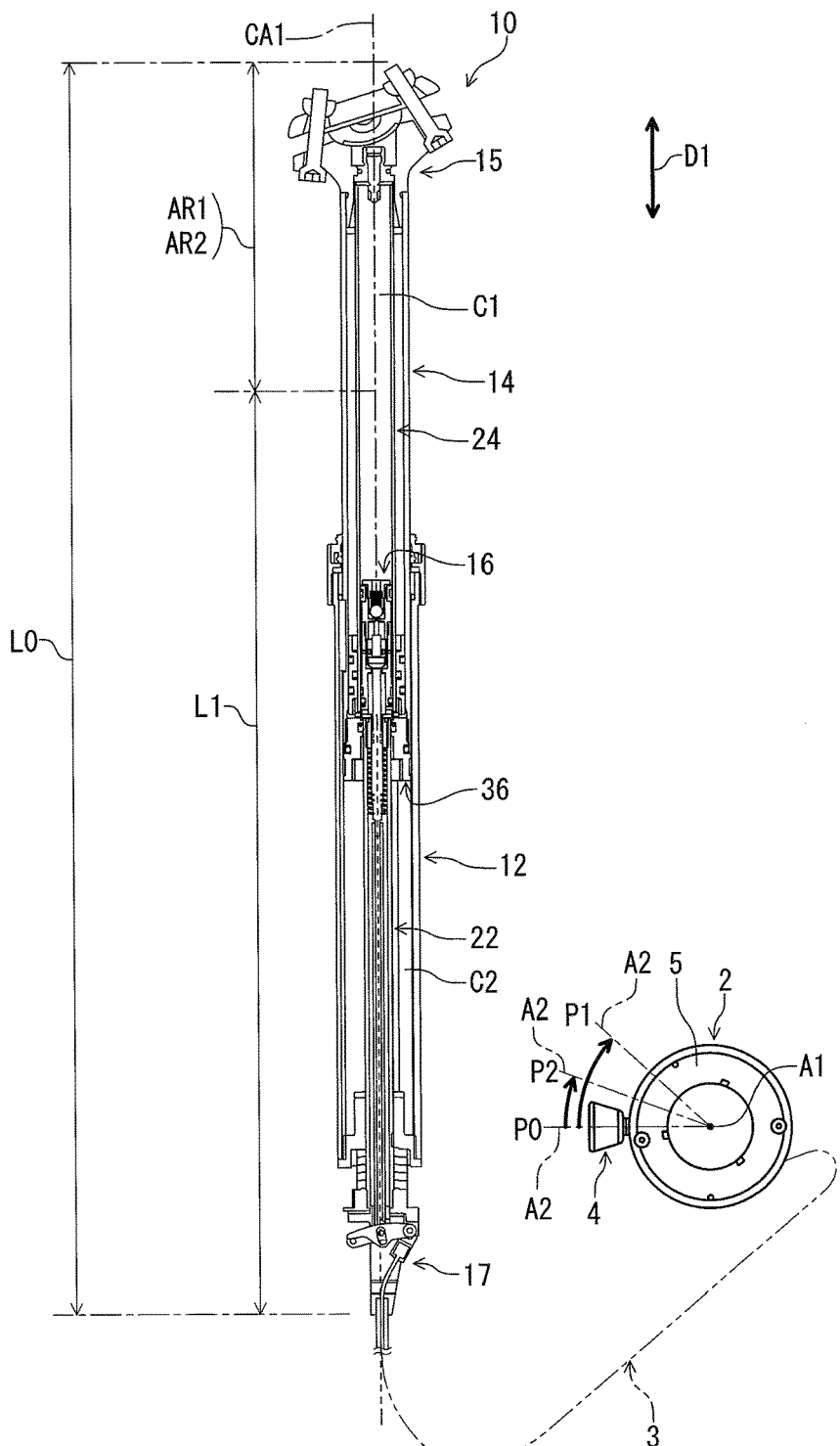
FIG. 2 is a cross-sectional view of the bicycle seatpost assembly illustrated in FIG. 1.

As seen in FIG. 2, the bicycle seatpost assembly 10 has a center axis CA1. The center axis CA1 is defined as a center axis of the first tube 12 and/or the second tube 14. The telescopic direction D1 is parallel to the center axis CA1 The first tube 12 and the second tube 14 are movable relative to each other in the telescopic direction D1.

The bicycle seatpost assembly 10 comprises a positioning structure 16 to relatively position the first tube 12 and the second tube 14. The positioning structure 16 is mounted to at least one of the first tube 12 and the second tube 14 and is configured to change a state of the bicycle seatpost assembly 10 among a first adjustable state (FIG. 5) and a second adjustable state (FIG. 6). In this embodiment, the positioning structure 16 changes the state of the bicycle seatpost assembly 10 among a lock state (FIG. 4), the first adjustable state (FIG. 5), and the second adjustable state (FIG. 6). The lock state, the first adjustable state, and the second adjustable state will be described later.

The positioning structure 16 is operated via an operating device 2. For example, the operating device 2 is mounted on the bicycle handlebar (not shown). The bicycle seatpost assembly 10 comprises an actuation structure 17 to actuate the positioning structure 16 in response to operation of the operating device 2. The actuation structure 17 is operatively coupled to the operating device 2 via a control cable 3 such as a Bowden cable. The actuation structure 17 is attached to the second tube 14 to transmit an operation force (e.g., pulling force) applied from the operating device 2 via the control cable 3.

As seen in FIG. 2, the operating device 2 is configured to output a first operation and a second operation different from the first operation. More specifically, the operating device 2 includes an operated member 4 and a base member 5. The operated member 4 is configured to be pivotable relative to the base member 5 from a rest position P0 to a first operated position P1 about a pivot axis A1. The operated member 4 is configured to be pivotable relative to the base member 5 from the rest position P0 to a second operated position P2 about the pivot axis A1. The second operated position P2 is defined between the rest position P0 and the first operated position P1. Each of the rest position P0, the second operated position P2, and the first operated position P1 is defined based on a center axis A2 of the operated member 4.

The control cable 3 is pulled by a first amount of operation when the operated member 4 is pivoted relative to the base member 5 from the rest position P0 to the first operated position P1. The control cable 3 is pulled by a second amount of operation when the operated member 4 is pivoted relative to the base member 5 from the rest position P0 to the second operated position P2. The second amount of operation is different from the first amount of operation. In this embodiment, the first amount of operation is larger than the second amount of operation.

As seen in FIG. 2, the bicycle seatpost assembly 10 has a maximum overall length L0 and a minimum overall length L1. The overall length of the bicycle seatpost assembly 10 is adjustable within a first adjustable range AR1 defined as a difference between the maximum overall length L0 and the minimum overall length L1. The first tube 12 and the second tube 14 are relatively movable in the first adjustable state within the first adjustable range AR1. The first tube 12 and the second tube 14 are relatively movable in the second adjustable state within a second adjustable range AR2 equal to the first adjustable range AR1. While the second adjustable range AR2 is equal to the first adjustable range AR1 in this embodiment, the second adjustable range AR2 can be different from the first adjustable range AR1.

In the locked state, the second tube 14 is positioned relative to the first tube 12 in the telescopic direction D1. Specifically, in the locked state, the overall length of the bicycle seatpost assembly 10 is maintained at an adjusted overall length. In the locked state, the first tube 12 and the second tube 14 are fixedly positioned relative to each other in the telescopic direction D1.

In each of the first adjustable state and the second adjustable state, a position of the second tube 14 is continuously adjustable relative to the first tube 12 in the telescopic direction D1. Each of the first adjustable state and the second adjustable state of the bicycle seatpost assembly 10 is not limited to this embodiment. The total length of the bicycle seatpost assembly 10 can be stepwise adjusted in at least one of the first adjustable state and the second adjustable state. For example, the total length of the bicycle seatpost assembly 10 can be stepwise adjusted at each of different lengths.

Figure 3:
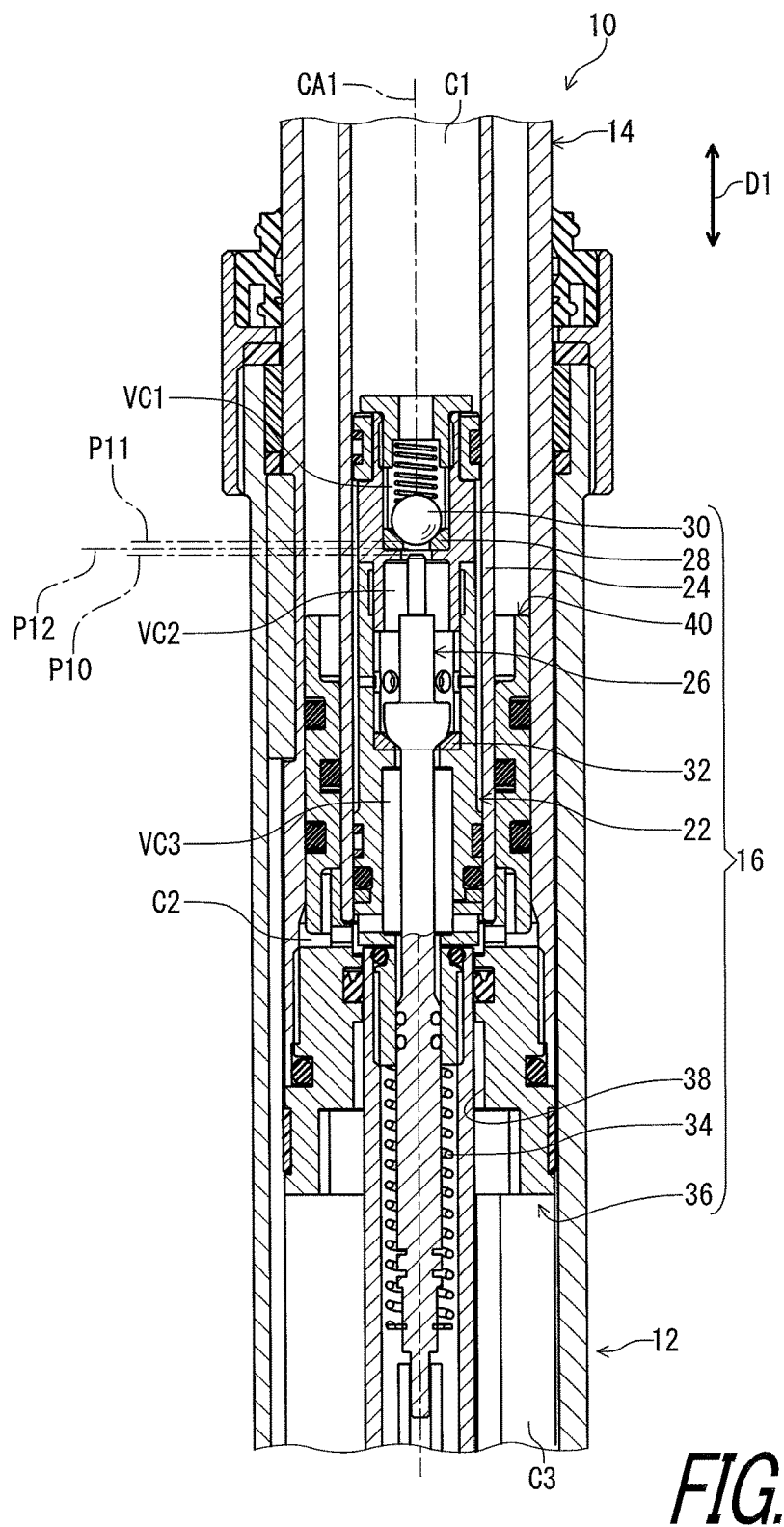
FIG. 3 is a partial cross-sectional view of the bicycle seatpost assembly illustrated in FIG. 1 (a closed position).

As seen in FIG. 3, the positioning structure 16 includes a support member 22, an inner tube 24, and a control member 26. A lower end of the support member 22 is secured to the first tube 12 (FIG. 2). The support member 22 is movable integrally with the first tube 12 relative to the second tube 14 in the telescopic direction D1. An upper end of the inner tube 24 is secured to the second tube 14 (FIG. 2). The inner tube 24 is movable integrally with the second tube 14 relative to the first tube 12 in the telescopic direction D1. The support member 22 is movably provided in the inner tube 24. The control member 26 is movably provided in the support member 22.

As seen in FIG. 3, the support member 22 includes a first valve chamber VC1, a second valve chamber VC2, and a third valve chamber VC3. The second valve chamber VC2 is provided between the first valve chamber VC1 and the third valve chamber VC3 in the telescopic direction D1.

The positioning structure 16 includes a first seal member 28, a valve member 30, and a second seal member 32. The positioning structure 16 has a closed state (FIG. 4), a first open state (FIG. 5), and a second open state (FIG. 6). The closed state corresponds to the locked state of the bicycle seatpost assembly 10. The first open state corresponds to the first adjustable state of the bicycle seatpost assembly 10. The second open state corresponds to the second adjustable state of the bicycle seatpost assembly 10.

The control member 26 is movable relative to the second tube 14 in the telescopic direction D1 between a first open position P11 and a second open position P12. The control member 26 is movably mounted to the second tube 14 to move relative to the second tube 14 in the telescopic direction D1 in response to an amount of operation of the control cable 3 (FIG. 2). In this embodiment, the control member 26 is movable relative to the support member 22 and the first tube 12 in the telescopic direction D1 between a closed position P10 and the second open position P12 through the first open position P11. In the closed state (FIG. 4) of the positioning structure 16, the control member 26 is positioned at the closed position P10. The positioning structure 16 is in the first adjustable state in the first open state (FIG. 5) where the control member 26 is positioned at the first open position P11. The positioning structure 16 is in the second adjustable state in the second open state (FIG. 6) where the control member 26 is positioned at the second open position P12.

The positioning structure 16 includes a biasing element 34 to bias the control member 26 relative to the support member 22 toward the closed position P10. The control member 26 is positioned at the closed position P10 by a biasing force of the biasing element 34. The control member 26 is moved from the closed position P10 toward the first open position P11 relative to the support member 22 against a biasing force of the biasing element 34. The position of the control member 26 is continuously adjustable relative to the support member 22 between the closed position P10 and the first open position P11 using the operating device 2 (FIG. 2).

As seen in FIG. 3, the positioning structure 16 includes a sealing structure 36 having an annular shape. The sealing structure 36 is secured to a lower end of the second tube 14. A lower end of the inner tube 24 is secured to the sealing structure 36. The sealing structure 36 includes a guide hole 38 extending in the telescopic direction D1. The support member 22 extends through the guide hole 38 of the sealing structure 36 in the telescopic direction D1.

The positioning structure 16 includes a piston 40 having an annular shape. The piston 40 includes a guide hole 42 extending in the telescopic direction D1. The inner tube 24 extends through the guide hole 42 of the piston 40 in the telescopic direction D1. The piston 40 is movable relative to the second tube 14 and the inner tube 24 in the telescopic direction D1.

As seen in FIG. 3, the positioning structure 16 includes a first chamber C1 and a second chamber C2. The first chamber C1 is defined by the support member 22, the inner tube 24, and the mounting structure 15 (FIG. 2). The second chamber C2 is defined by the second tube 14, the inner tube 24, the sealing structure 36, and the piston 40. The positioning structure 16 includes a third chamber C3. The third chamber C3 is defined by the first tube 12, the support member 22, and the sealing structure 36. Each of the first chamber C1 and the second chamber C2 is filled with a substantially incompressible fluid (e.g., oil), for example. The third chamber C3 is in communication with an outside of the bicycle seatpost assembly 10, for example.

Figure 4:
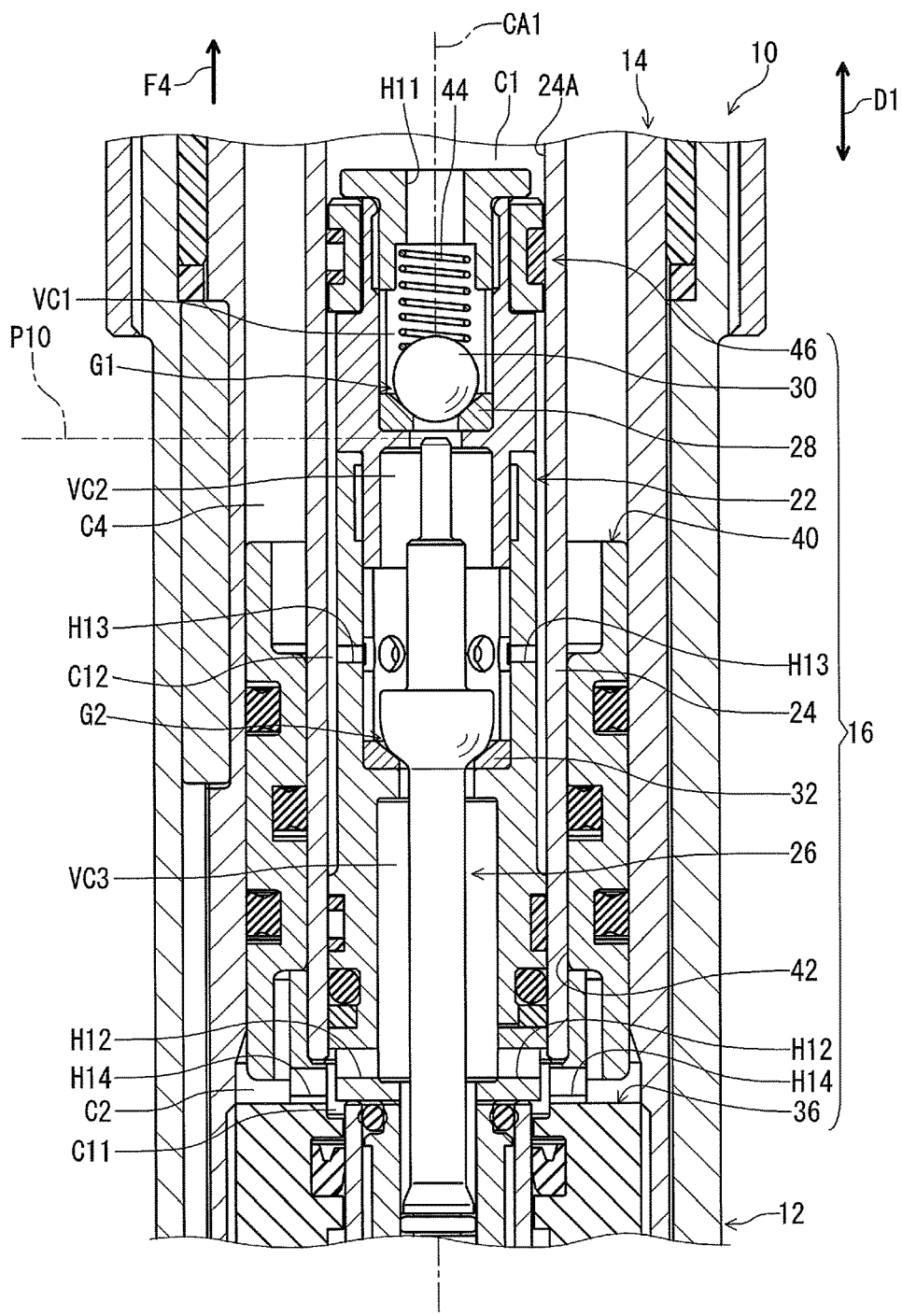
FIG. 4 is an enlarged partial cross-sectional view of the bicycle seatpost assembly illustrated in FIG. 1 (the closed position).

As seen in FIG. 4, the positioning structure 16 includes an second intermediate chamber C12 and a first intermediate chamber C11. The second intermediate chamber C12 is defined by the support member 22 and the inner tube 24. The first intermediate chamber C11 is defined by the support member 22, the inner tube 24, and the sealing structure 36. Each of the second intermediate chamber C12 and the first intermediate chamber C11 is filled with the substantially incompressible fluid (e.g., oil), for example.

The positioning structure 16 includes a biasing chamber C4. The biasing chamber C4 is defined by the second tube 14, the inner tube 24, the piston 40, and the mounting structure 15 (FIG. 2). A compressible fluid (e.g., air or gas other than air) is filled in the biasing chamber C4. The biasing chamber C4 is configured to apply a biasing force F4 to the piston 40 so that the second tube 14 upwardly moves relative to the first tube 12 in the telescopic direction D1. The compressible fluid is compressed in the biasing chamber C4 in a state where the overall length of the bicycle seatpost assembly 10 is the maximum overall length L0 (FIG. 2).

As seen in FIG. 4, the positioning structure 16 includes a valve biasing member 44 to bias the valve member 30 against the first seal member 28. The control member 26 moves the valve member 30 relative to the first seal member 28 against a biasing force of the valve biasing member 44 to open a first gate G1. The valve member 30 is provided between the first seal member 28 and the valve biasing member 44 in the telescopic direction D1. The valve member 30 is provided between the control member 26 and the valve biasing member 44 in the telescopic direction D1. The valve biasing member 44 is provided in the first valve chamber VC1.

Figure 5:
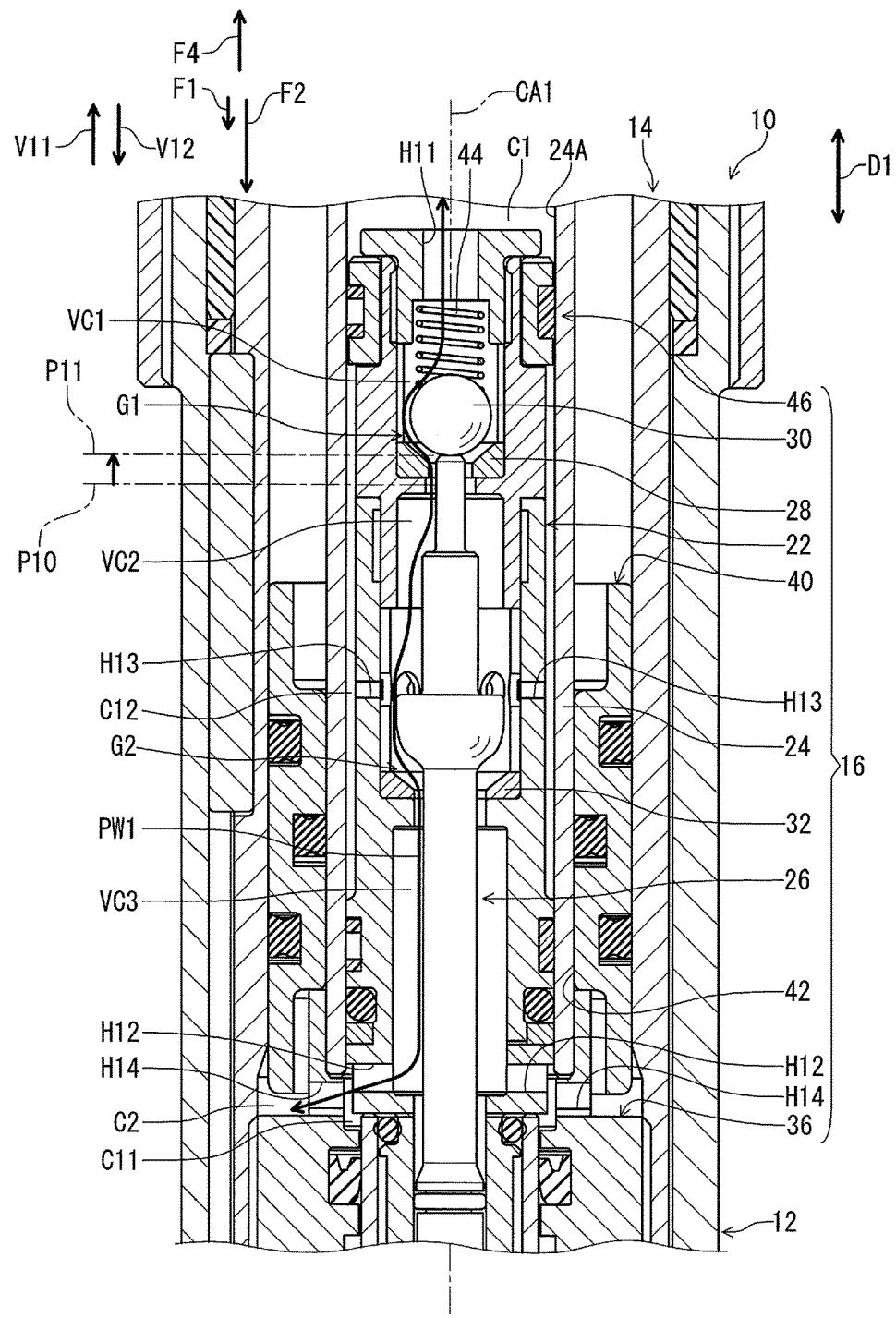
FIG. 5 is an enlarged partial cross-sectional view of the bicycle seatpost assembly illustrated in FIG. 1 (a first open position).
Figure 6:
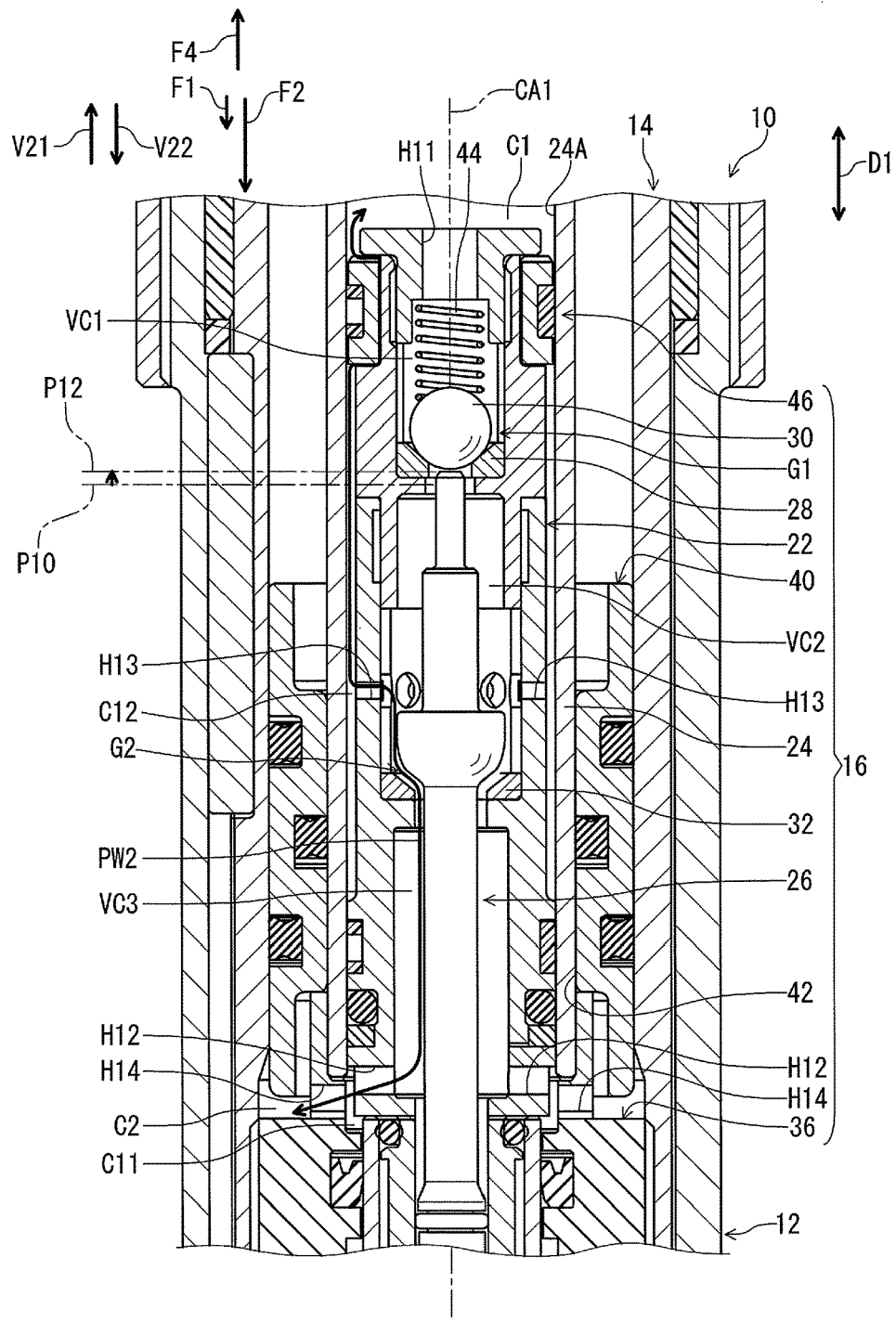
FIG. 6 is an enlarged partial cross-sectional view of the bicycle seatpost assembly illustrated in FIG. 1 (a second open position).

As seen in FIG. 5, the positioning structure 16 includes a first passageway PW1 to connect the first chamber C1 to the second chamber C2 in the first adjustable state. The positioning structure 16 includes a first gate G1 provided on the first passageway PW1. The first gate G1 has a first closed state and a first open state. The positioning structure 16 changes a state of the first gate G1 between the first closed state and the first open state in response to a position of the control member 26 relative to the second tube 14.

In this embodiment, the valve member 30 provides the first gate G1 of the first passageway PW1 together with the first seal member 28. The valve member 30 is contactable with the first seal member 28 to close the first gate G1. The control member 26 moves the valve member 30 relative to the first seal member 28 to open the first gate G1. The first valve chamber VC1 is in communication with the second valve chamber VC2 via the first gate G1 in a state where the first gate G1 is open.

When the control member 26 is positioned at the closed position P10, the valve member 30 is in contact with the first seal member 28 to close the first gate G1. When the control member 26 is positioned at the first open position P11, the valve member 30 is spaced apart from the first seal member 28 to open the first gate G1.

As seen in FIG. 5, the support member 22 includes a first through-hole H11, second through-holes H12, and third through-holes H13. The sealing structure 36 includes fourth through-holes H14. The first through-hole H11 connects the first chamber C1 to the first valve chamber VC1. The second through-holes H12 connects the third valve chamber VC3 to the second chamber C2. The third through-holes H13 connects the third valve chamber VC3 to the second intermediate chamber C12. The fourth through-holes H14 connects the third valve chamber VC3 and the first intermediate chamber C11. The first passageway PW1 includes the first through-hole H11, the first to third valve chambers VC1 to VC3, the second through-holes H12, the first intermediate chamber C11, and the fourth through-holes H14.

As seen in FIG. 6, the positioning structure 16 closes the first passageway PW1 in the second adjustable state. The positioning structure 16 includes a second passageway PW2 to connect the first chamber C1 to the second chamber C2 in the second adjustable state. The second passageway PW2 can also be referred to as a fluid passageway PW2. The positioning structure 16 opens the second passageway PW2 in the first adjustable state. The positioning structure 16 includes a second gate G2 provided on the second passageway PW2. The second gate G2 has a second closed state and a second open state. The positioning structure 16 changes a state of the second gate G2 between the second closed state and the second open state in response to the position of the control member 26 relative to the second tube 14.

In this embodiment, the second seal member 32 provides the second gate G2 of the second passageway PW2 together with the control member 26. The second valve chamber VC2 is in communication with the third valve chamber VC3 via the second gate G2 in a state where the second gate G2 is open.

When the control member 26 is positioned at the closed position P10, the control member 26 is in contact with the second seal member 32 to close the second gate G2. When the control member 26 is positioned at the second open position P12, the control member 26 is spaced apart from the second seal member 32 to open the second gate G2. The second passageway PW2 includes the second intermediate chamber C12, the third through-hole H13, the second and third valve chambers VC2 and VC3, the second through-holes H12, the first intermediate chamber C11, and the fourth through-holes H14.

In the first adjustable state, the second tube 14 is retracted or extended relative to the first tube 12 at a first speed in response to a reference force applied to the second tube 14. The reference force is, for example a force applied on the upper end of the second tube 14 in a downward direction. In the second adjustable state, the second tube 14 is retracted or extended relative to the first tube 12 at a second speed in response to the reference force applied to the second tube 14. The second speed is lower than the first speed.

In a case where the second tube 14 is retracted relative to the first tube 12, the reference force is defined as a force equal to or greater than a minimum force needed for retracting the second tube 14 relative to the first tube 12 against the biasing force F4 of the biasing chamber C4. In a case where the second tube 14 is retracted relative to the first tube 12, the reference force is larger than the biasing force F4 of the biasing chamber C4, and examples of the reference force include an average adult weight.

In a case where the second tube 14 is extended relative to the first tube 12, the reference force is defined as a force that is opposite to the biasing force F4 of the biasing chamber C4 but does not prevent the second tube 14 from extending relative to the first tube 12. In a case where the second tube 14 is extended relative to the first tube 12, the reference force is smaller than the biasing force F4, and examples of the reference force include a force defined from 0% to 30% of the average adult weight. Namely, in a case where the second tube 14 is extended relative to the first tube 12, the reference force can be zero. The biasing force F4 can be the reference force in a case where the force applied on the upper end of the second tube 14 in the downward direction is zero. In this case, the reference force (the biasing force F4) decreases in response to an extension of the second tube 14 relative to the first tube 12. The reference force (the biasing force F4) increases in response to a retraction of the second tube 14 relative to the first tube 12. Namely, the reference force can be constant or inconstant.

The positioning structure 16 changes a speed of the second tube 14 between the first speed and the second speed. The positioning structure 16 change a passageway between the first passageway PW1 (the first adjustable state) and the second passageway PW2 (the second adjustable state) to change the speed of the second tube 14.

As seen in FIG. 5, in the first adjustable state, the second tube 14 is extended relative to the first tube 12 at a first speed V11 in response to a reference force F1 applied to the second tube 14. As seen in FIG. 6, in the second adjustable state, the second tube 14 is extended relative to the first tube 12 at a second speed V21 in response to the reference force F1 applied to the second tube 14. The second speed V21 is lower than the first speed V11.

Each of the first speed V11 and the second speed V21 varies in accordance with a position of the second tube 14 relative to the first tube 12 because the biasing force F4 varies in response to the extension or the retraction of the second tube 14 relative to the first tube 12. Thus, each of the first speed V11 and the second speed V21 can be defined as an average speed of the second tube 14 when the second tube 14 is extended from a first position (e.g., a lowest position) to a second position (e.g., a highest position).

Furthermore, in the first adjustable state, the second tube 14 is extended relative to the first tube 12 at a first acceleration AC11 in response to the reference force applied to the second tube 14. In the second adjustable state, the second tube 14 is extended relative to the first tube 12 at a second acceleration AC21 in response to the reference force applied to the second tube 14. The first acceleration AC11 is different from the second acceleration AC21. In the illustrated embodiment, the second acceleration AC21 is lower than the first acceleration AC11. However, the second acceleration AC21 can be greater than the first acceleration AC11.

As seen in FIG. 5, in the first adjustable state, the second tube 14 is retracted relative to the first tube 12 at a first speed V12 in response to a reference force F2 applied to the second tube 14. As seen in FIG. 6, in the second adjustable state, the second tube 14 is retracted relative to the first tube 12 at a second speed V22 in response to the reference force F2 applied to the second tube 14. The second speed V22 is lower than the first speed V12. The reference force F2 is greater than the reference force F1.

Each of the first speed V12 and the second speed V22 varies in accordance with a position of the second tube 14 relative to the first tube 12 because the biasing force F4 varies in response to the extension or the retraction of the second tube 14 relative to the first tube 12. Thus, each of the first speed V12 and the second speed V22 can be defined as an average speed of the second tube 14 when the second tube 14 is retracted from the second position (e.g., the highest position) to the first position (e.g., the lowest position).

Furthermore, in the first adjustable state, the second tube 14 is retracted relative to the first tube 12 at a first acceleration AC12 in response to the reference force applied to the second tube 14. In the second adjustable state, the second tube 14 is retracted relative to the first tube 12 at a second acceleration AC22 in response to the reference force applied to the second tube 14. The first acceleration AC12 is different from the second acceleration AC22. In the illustrated embodiment, the second acceleration AC22 is lower than the first acceleration AC12. However, the second acceleration AC22 can be greater than the first acceleration AC12.

Figure 7:
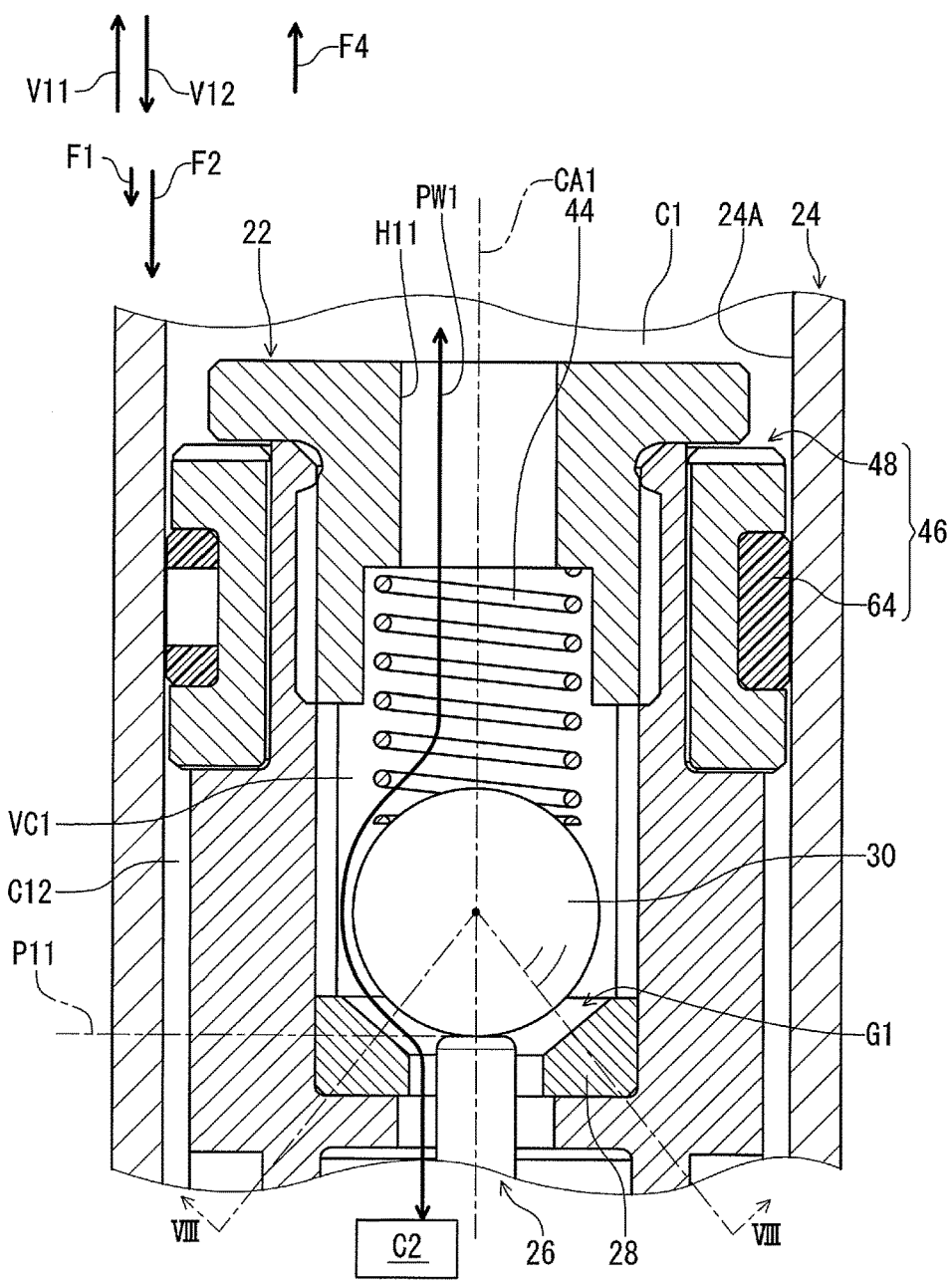
FIG. 7 is an enlarged partial cross-sectional view of the bicycle seatpost assembly illustrated in FIG. 1 (the first open position).
Figure 8:
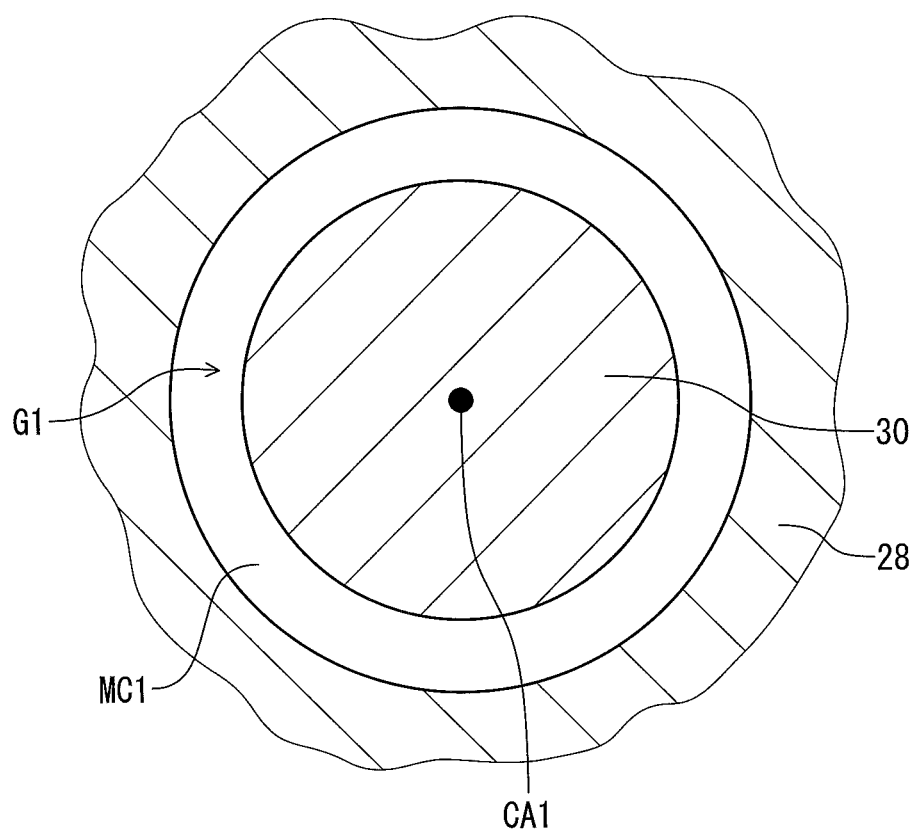
FIG. 8 is a cross-sectional view of the bicycle seatpost assembly taken along line VIII-VIII of FIG. 7 (the first open position).
Figure 10:
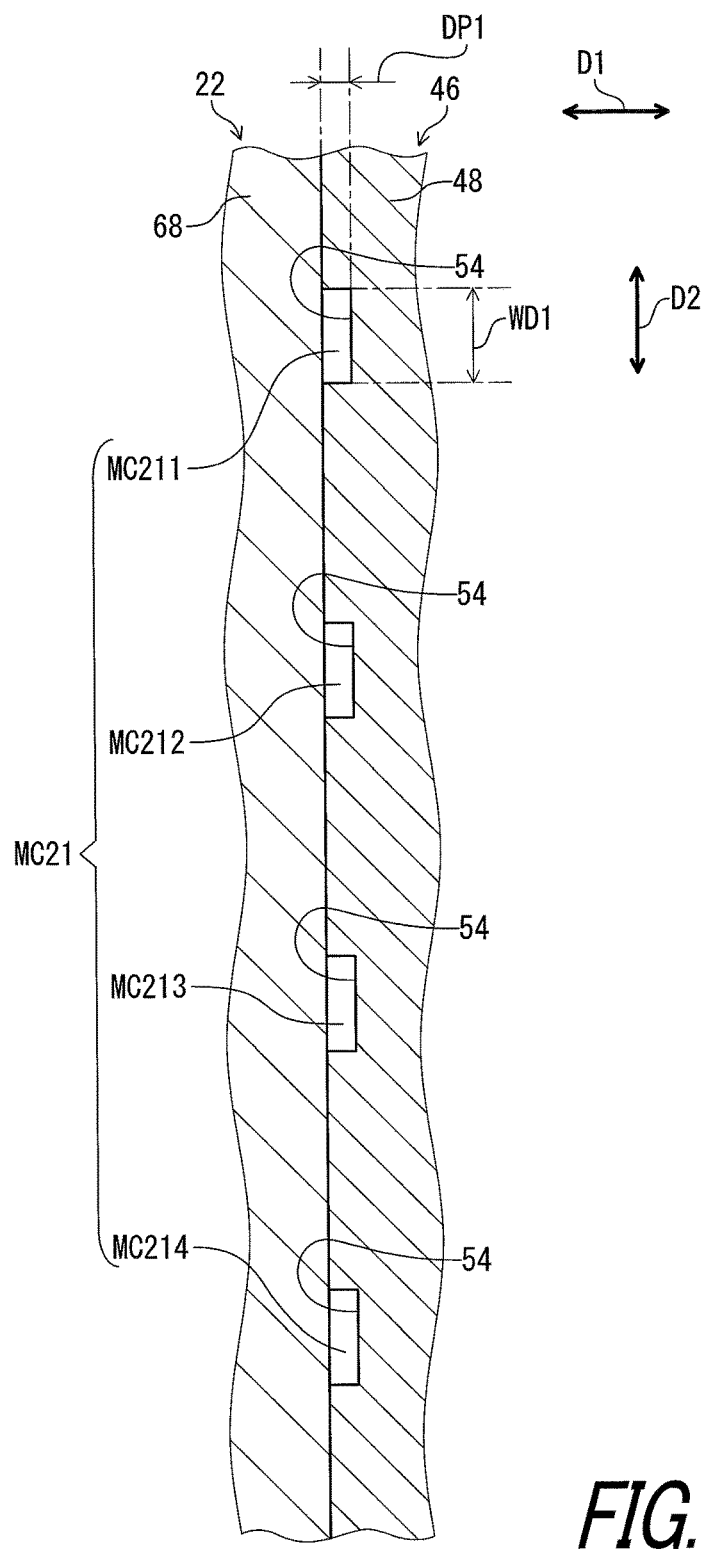
FIG. 10 is a cross-sectional view showing an extension minimum cross-sectional area of the bicycle seatpost assembly illustrated in FIG. 1.

As seen in FIGS. 7 and 8, the first passageway PW1 has a first minimum cross-sectional area MC1 in the first adjustable state. In the first adjustable state, the first chamber C1 is connected to the second chamber C2 via the first passageway PW1 having the first minimum cross-sectional area MC1. In this embodiment, the first minimum cross-sectional area MC1 is defined at the first gate G1 in the first open state where the control member 26 is positioned at the first open position P11. The first minimum cross-sectional area MC1 is defined between the first seal member 28 and the valve member 30 in the first open state. Specifically, the first minimum cross-sectional area MC1 is defined on a cross-section taken along line VIII-VIII of the FIG. 7. FIG. 10 shows the cross-section taken along the line VIII-VIII of FIG. 7. A minimum distance is defined between the valve member 30 and the first seal member 28 on the line VIII-VIII of FIG. 7. The cross-section depicted in FIG. 8 is taken along a conical plane defined by the line VIII-VIII of FIG. 7.

Figure 9:
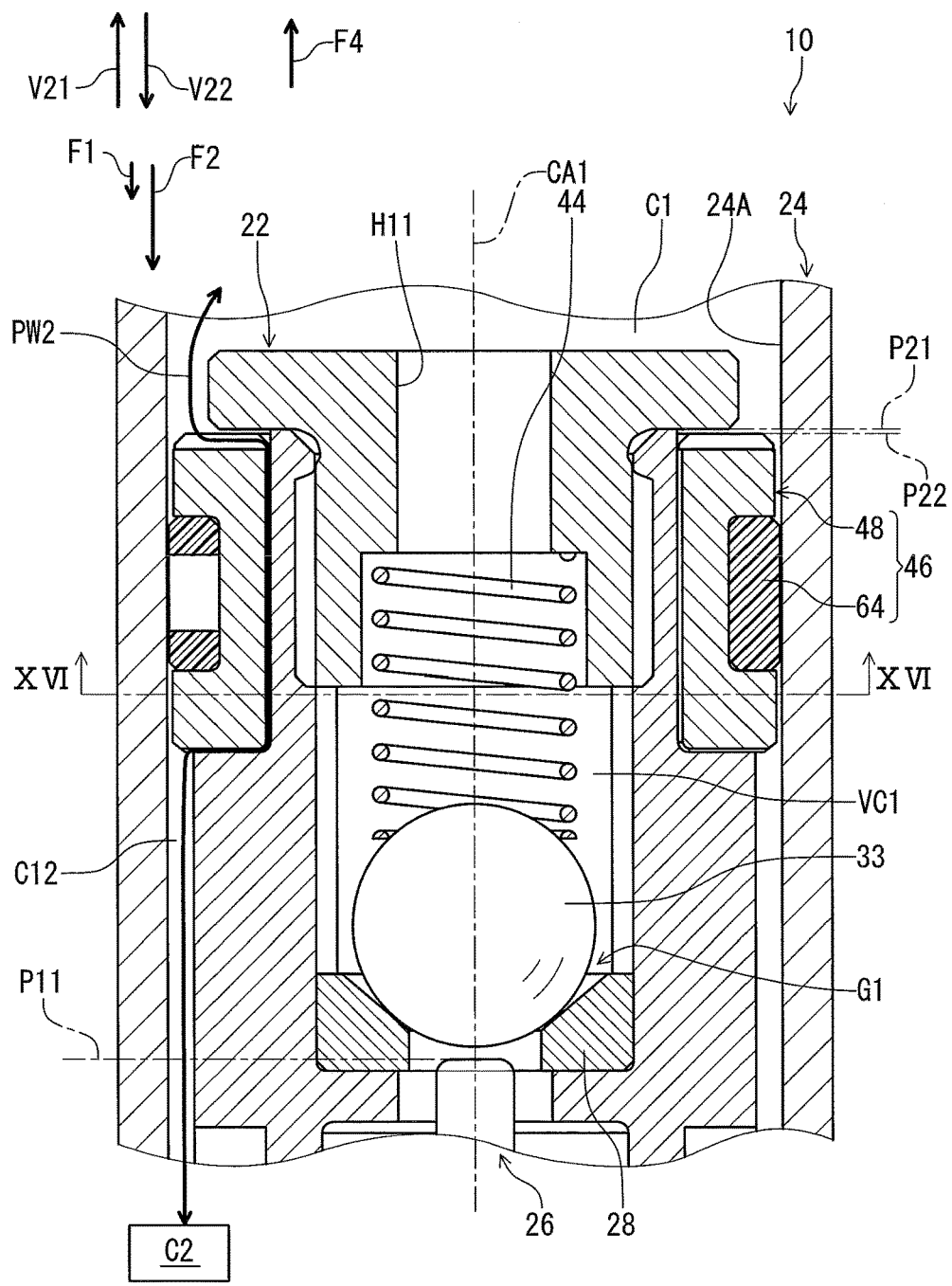
FIG. 9 is an enlarged partial cross-sectional view of the bicycle seatpost assembly illustrated in FIG. 1 (the second open position).
Figure 11:
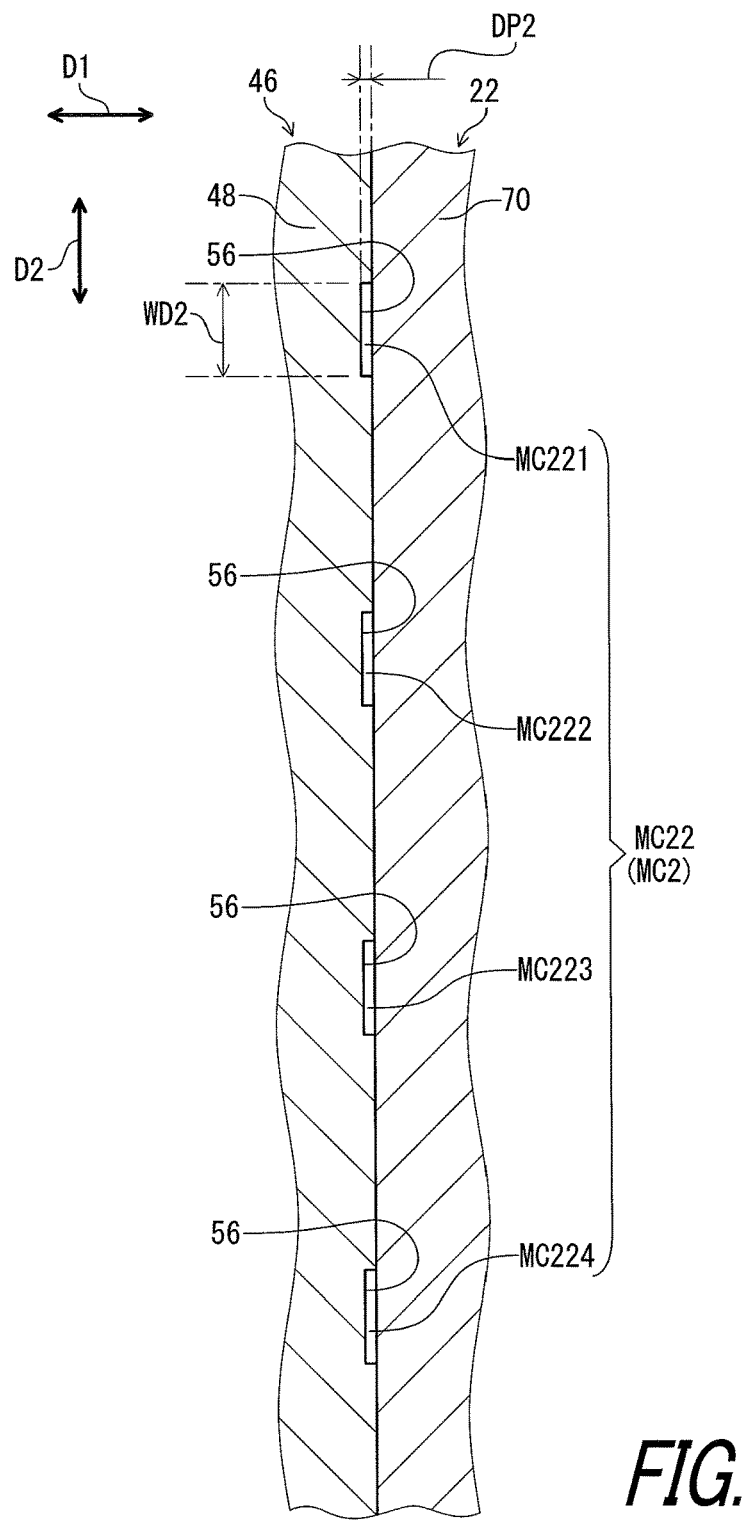
FIG. 11 is a cross-sectional view showing a retraction minimum cross-sectional area of the bicycle seatpost assembly illustrated in FIG. 1.

As seen in FIGS. 9 to 11, the second passageway PW2 has a second minimum cross-sectional area MC2 in the second adjustable state. The second minimum cross-sectional area MC2 is smaller than the first minimum cross-sectional area MC1. In the second adjustable state, the first chamber C1 is connected to the second chamber C2 via the second passageway PW2 having the second minimum cross-sectional area MC2. In this embodiment, the second minimum cross-sectional area MC2 is defined at a changing device 46 in the second open state where the control member 26 is positioned at the second open position P12. The second minimum cross-sectional area MC2 can also be referred to as a minimum cross-sectional area MC2. The minimum cross-sectional area is defined on a minimum cross-section of a fluid passageway (e.g., the second passageway PW2) in each of the first adjustable state and the second adjustable state.

As seen in FIG. 9, the positioning structure 16 includes the changing device 46 to change the second minimum cross-sectional area MC2 of the second passageway PW2 between an extension minimum cross-sectional area MC21 (FIG. 10) and a retraction minimum cross-sectional area MC22 (FIG. 11) in accordance with a direction of fluid flowing in the second passageway PW2. The extension minimum cross-sectional area MC21 is different from the retraction minimum cross-sectional area MC22. In this embodiment, the retraction minimum cross-sectional area MC22 is smaller than the extension minimum cross-sectional area MC21. However, the retraction minimum cross-sectional area MC22 can be equal to or larger than the extension minimum cross-sectional area MC21.

In this embodiment, the changing device 46 changes the second minimum cross-sectional area MC2 of the second passageway PW2 to the extension minimum cross-sectional area MC21 in the second adjustable state when the second tube 14 is extended relative to the first tube 12. The changing device 46 changes the second minimum cross-sectional area MC2 of the second passageway PW2 to the retraction minimum cross-sectional area MC22 in the second adjustable state when the second tube 14 is retracted relative to the first tube 12.

The changing device 46 is provided on the fluid passageway PW2 to change the minimum cross-sectional area MC2 of the fluid passageway PW2 between the retraction minimum cross-sectional area MC22 in a state where the second tube 14 is retracted relative to the first tube 12, and the extension minimum cross-sectional area MC21 in a state where the second tube 14 is extended relative to the first tube 12.

Figure 12:
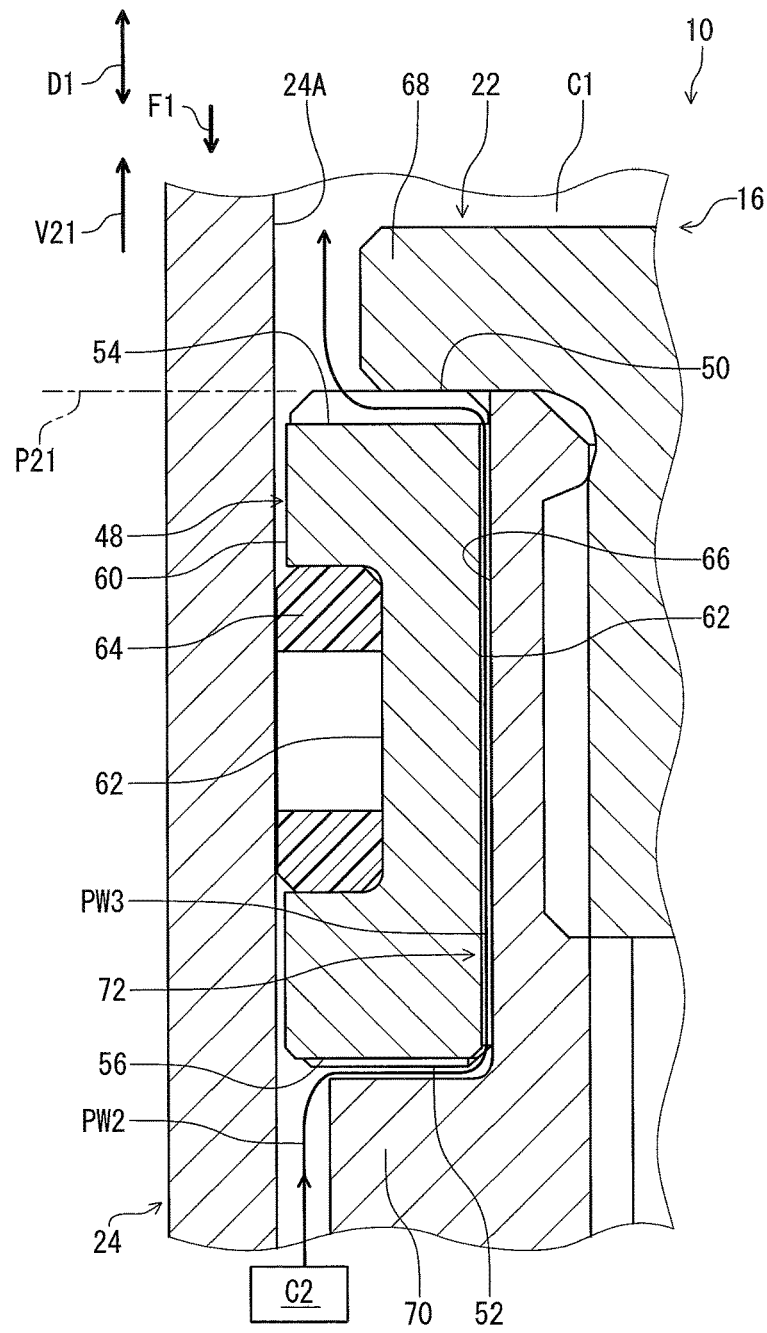
FIG. 12 is a cross-sectional view showing a valve element of a changing device of the bicycle seatpost assembly illustrated in FIG. 1 (a first position).
Figure 13:
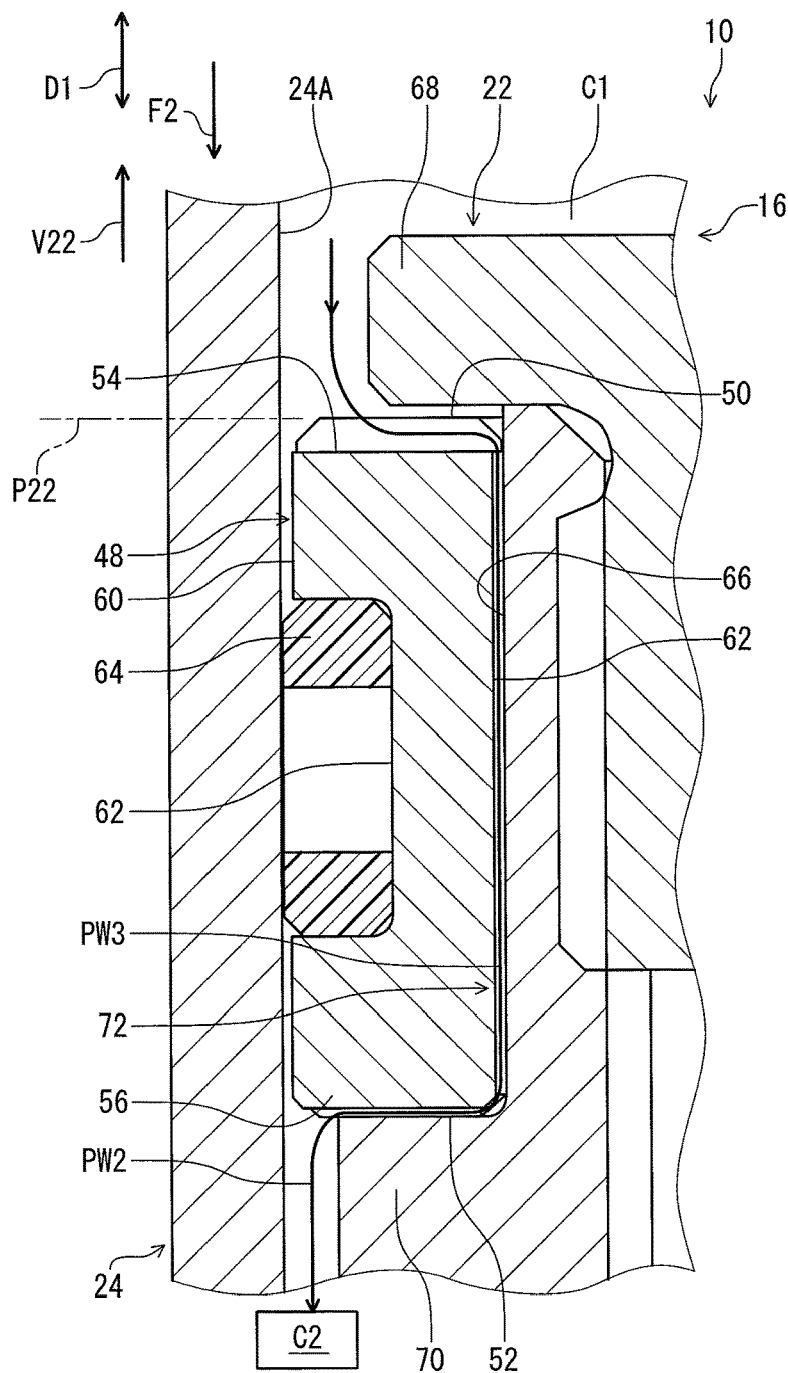
FIG. 13 is a cross-sectional view showing a valve element of a changing device of the bicycle seatpost assembly illustrated in FIG. 1 (a second position).

As seen in FIGS. 12 and 13, the changing device 46 includes the support member 22 and a valve element 48. The valve element 48 is movable relative to the support member 22 in the telescopic direction D1 between a first position P21 and a second position P22 in response to the direction of fluid flowing in the second passageway PW2. As seen in FIG. 12, the support member 22 and the valve element 48 defines the extension minimum cross-sectional area MC21 in a state where the valve element 48 is positioned at the first position P21 relative to the support member 22. As seen in FIG. 13, the support member 22 and the valve element 48 defines the retraction minimum cross-sectional area MC22 in a state where the valve element 48 is positioned at the second position P22 relative to the support member 22.

As seen in FIG. 12, the valve element 48 is moved relative to the support member 22 to the first position P21 when fluid flows from the second chamber C2 to the first chamber C1 through the second passageway PW2. The fluid flowing the second passageway PW2 pushes the valve element 48 toward the first position P21. As seen in FIG. 13, the valve element 48 is moved relative to the support member 22 to the second position P22 when fluid flows from the first chamber C1 to the second chamber C2 through the second passageway PW2. The fluid flowing the second passageway PW2 pushes the valve element 48 toward the second position P22. Thus, the changing device 46 changes the second minimum cross-sectional area MC2 of the second passageway PW2 between the extension minimum cross-sectional area MC21 (FIG. 10) and the retraction minimum cross-sectional area MC22 (FIG. 11) in accordance with the direction of fluid flowing in the second passageway PW2.

Figure 14:
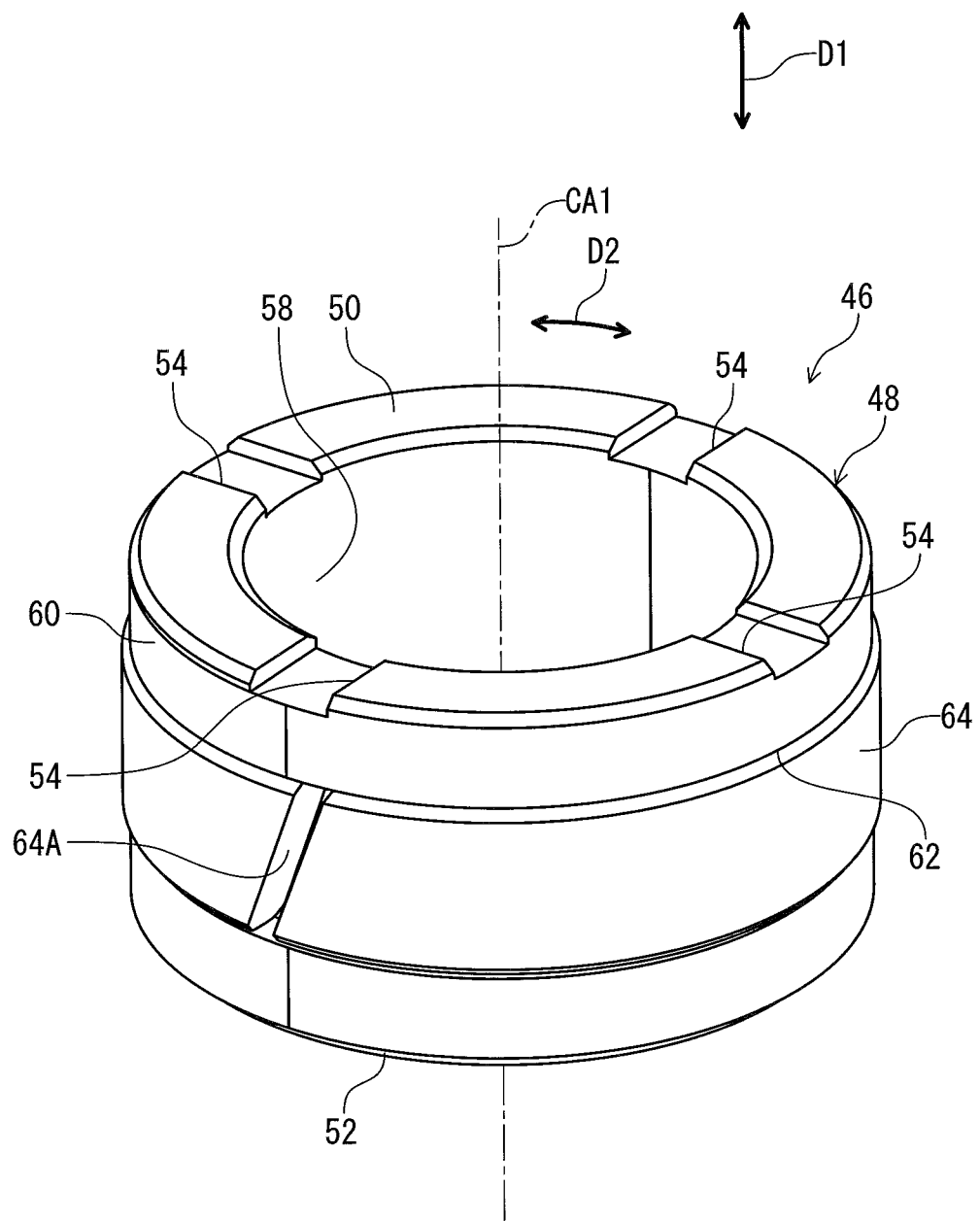
FIG. 14 is a perspective view of the changing device of the bicycle seatpost assembly illustrated in FIG. 1.
Figure 15:
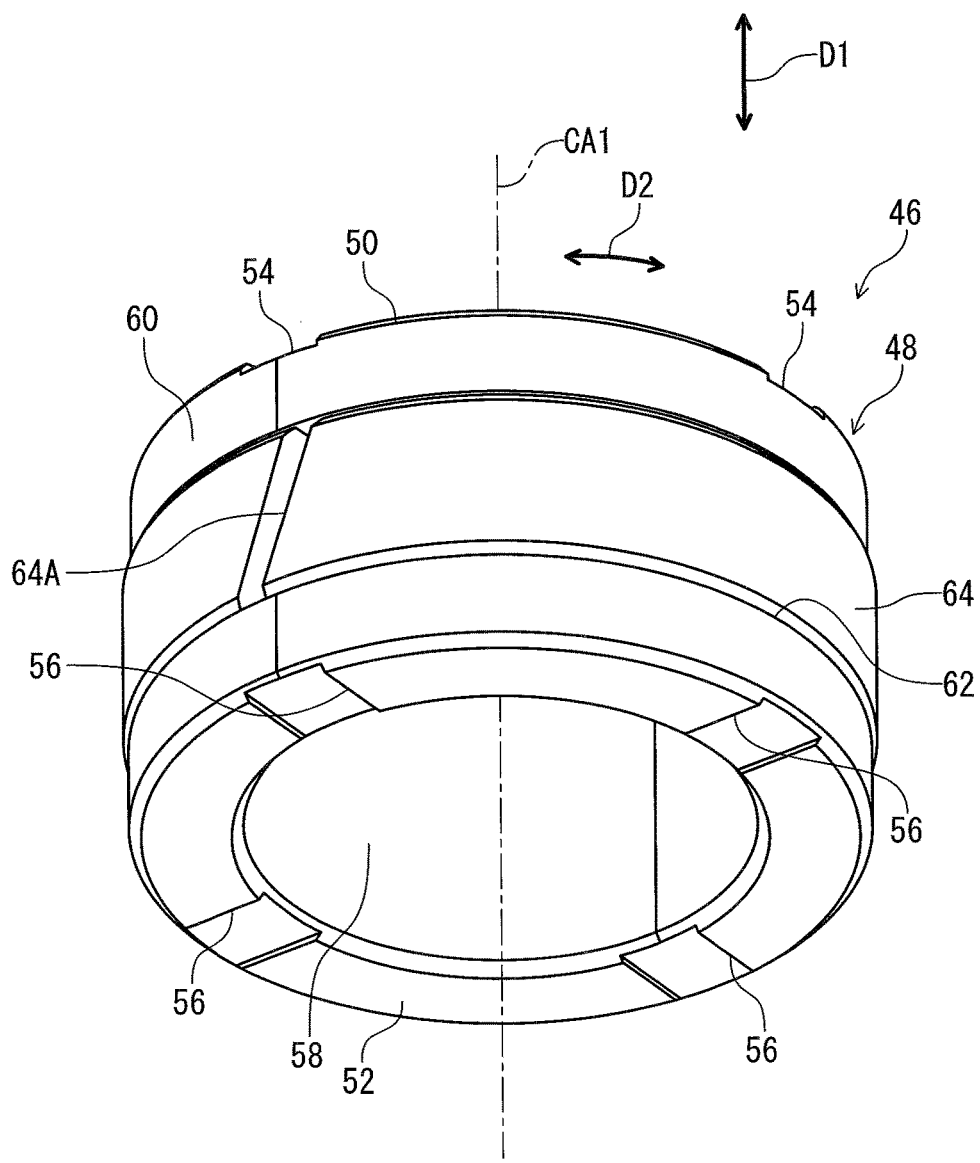
FIG. 15 is a perspective view of the changing device of the bicycle seatpost assembly illustrated in FIG. 1.

As seen in FIGS. 14 and 15, the valve element 48 has a tubular shape. The valve element 48 includes a first annular end 50 and a second annular end 52 opposite to the first annular end 50 in the telescopic direction D1. The valve element 48 includes at least one first groove 54 and at least one second groove 56. Specifically, the valve element 48 include a plurality of first grooves 54 and a plurality of second grooves 56.

As seen in FIG. 14, the first grooves 54 are provided at the first annular end 50. The first grooves 54 radially extend and are arranged in a circumferential direction D2 of the valve element 48. The valve element 48 includes a first inner peripheral surface 58 and a first outer peripheral surface 60. The first grooves 54 extend from the first inner peripheral surface 58 to the first outer peripheral surface 60.

As seen in FIG. 15, the second grooves 56 are provided at the second annular end 52. The second grooves 56 radially extend and are arranged in the circumferential direction D2 of the valve element 48. The second grooves 56 extend from the first inner peripheral surface 58 to the first outer peripheral surface 60.

As seen in FIG. 12, the valve element 48 includes an outer groove 62 provided on the first outer peripheral surface 60 of the valve element 48. The changing device 46 includes a seal element 64 provided in the outer groove 62. The seal element 64 is in slidable contact with an inner peripheral surface 24A of the inner tube 24. The valve element 48 is radially spaced apart from the inner peripheral surface 24A of the inner tube 24.

As seen in FIG. 14, the seal element 64 has a substantially annular shape. The seal element 64 includes a slit 64A. The seal element 64 is a separate member from the valve element 48 in this embodiment, the seal element 64 can be integrally provided with the valve element 48.

As seen in FIG. 12, the support member 22 includes a second outer peripheral surface 66, a first wall 68, and a second wall 70. The first wall 68 extends radially outward from the second outer peripheral surface 66 of the support member 22. The second wall 70 extends radially outward from the second outer peripheral surface 66 of the support member 22. The first wall 68 is spaced apart from the second wall 70. The support member 22 includes a support groove 72. The support groove 72 has an annular shape and is defined by the second outer peripheral surface 66, the first wall 68, and the second wall 70. The valve element 48 is movably provided in the support groove 72.

As seen in FIG. 10, the first wall 68 and the first grooves 54 define first cross-sectional areas MC211. The extension minimum cross-sectional area MC21 is defined as a total of the first cross-sectional areas MC211. Each of the first grooves 54 has a first width WD1 and a first depth DP1. The first width WD1 is larger than the first depth DP1.

As seen in FIG. 11, the second wall 70 and the second grooves 56 define second cross-sectional areas MC221. The retraction minimum cross-sectional area MC22 is defined as a total of the second cross-sectional areas MC221. Each of the second grooves 56 has a second width WD2 and a second depth DP2. The second width WD2 is larger than the second depth DP2. The second depth DP2 is smaller than the first depth DP1 while the second width WD2 is equal to the first width WD1. Thus, the retraction minimum cross-sectional area MC22 is smaller than the extension minimum cross-sectional area MC21.

Figure 16:
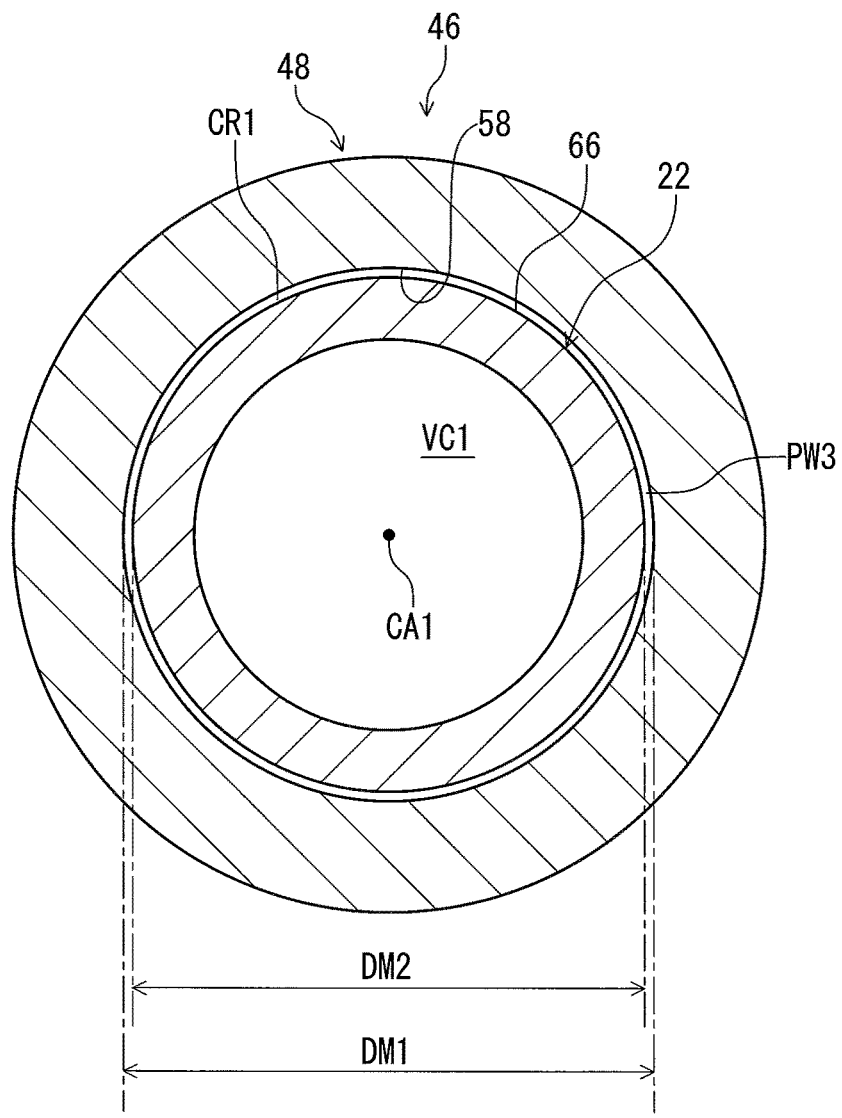
FIG. 16 is a cross-sectional view of the bicycle seatpost assembly taken along line XVI-XVI of FIG. 9.

As seen in FIG. 16, the valve element 48 includes an inner diameter DM1 defined by the first inner peripheral surface 58 of the valve element 48. The support member 22 includes an outer diameter DM2 defined by the second outer peripheral surface 66 of the support member 22. The inner diameter DM1 of the valve element 48 is larger than the outer diameter DM2 of the support member 22. The first inner peripheral surface 58 of the valve element 48 is spaced apart from the second outer peripheral surface 66 of the support member 22 to provide an intermediate passageway PW3 between the first grooves 54 and the second grooves 56. The intermediate passageway PW3 is included in the second passageway PW2.

Furthermore, a cross-sectional area CR1 is defined between the first inner peripheral surface 58 of the valve element 48 and the second outer peripheral surface 66 of the support member 22. The second minimum cross-sectional area MC2 is smaller than the cross-sectional area CR1. Each of the extension minimum cross-sectional area MC21 and the retraction minimum cross-sectional area MC22 is smaller than the cross-sectional area CR1.

While the positioning structure 16 has a hydraulic structure in this embodiment, the positioning structure 16 can have other structures such as a mechanical structure and an electrical structure. For example, the positioning structure 16 can include an electrically-operated device such as a motor.

The operation of the bicycle seatpost assembly 10 will be described in detail below.

As seen in FIG. 4, both the first gate G1 and the second gate G2 are closed in the lock state where the control member 26 is positioned at the closed position P10. In this lock state, the second tube 14 is fixedly positioned relative to the first tube 12.

As seen in FIG. 5, both first gate G1 and the second gate G2 are open when the control member 26 is moved from the closed position P10 to the first open position P11. In this first adjustable state, the first chamber C1 is connected to the second chamber C2 via the first passageway PW1 and the second passageway PW2. The fluid flows between the first chamber C1 and the second chamber C2 through the first passageway PW1 without through the second passageway PW2 since the second minimum cross-sectional area MC2 is smaller than the first minimum cross-sectional area MC1.

In a state where the reference force F1 is applied to the second tube 14, the second tube 14 is extended relative to the first tube 12 against the reference force F1 because of the biasing force F4 produced by the compressible fluid filled in the biasing chamber C4. At this time, the fluid flows from the second chamber C2 to the first chamber C1 through the first passageway PW1 having the first minimum cross-sectional area MC1 (FIG. 8). Thus, the second tube 14 is extended relative to the first tube 12 at the first speed V11.

In a state where the reference force F2 is applied to the second tube 14, the second tube 14 is retracted relative to the first tube 12 against the biasing force F4 of the biasing chamber C4 because of the reference force F2. At this time, the fluid flows from the first chamber C1 to the second chamber C2 through the first passageway PW1 having the first minimum cross-sectional area MC1 (FIG. 8). Thus, the second tube 14 is retracted relative to the first tube 12 at the first speed V12.

As seen in FIG. 6, only the second gate G2 is open when the control member 26 is moved from the closed position P10 to the second open position P12. In this second adjustable state, the first chamber C1 is connected to the second chamber C2 via the second passageway PW2 without via the first passageway PW1. The fluid flows between the first chamber C1 and the second chamber C2 through the second passageway PW2 without through the first passageway PW1 since the first gate G1 is closed.

In a state where the reference force F1 is applied to the second tube 14, the second tube 14 is extended relative to the first tube 12 against the reference force F1 because of the biasing force F4 produced by the compressible fluid filled in the biasing chamber C4. At this time, the fluid flows from the second chamber C2 to the first chamber C1 through the second passageway PW2. Specifically, as seen in FIG. 12, the fluid moves the valve element 48 to the first position P21 relative to the support member 22, causing the first grooves 54 and the first wall 68 to provide the extension minimum cross-sectional area MC21 smaller than the first minimum cross-sectional area MC1 (FIG. 8). Thus, the second tube 14 is extended relative to the first tube 12 at the second speed V21 that is lower than the first speeds V11 and V12.

In a state where the reference force F2 is applied to the second tube 14, the second tube 14 is retracted relative to the first tube 12 against the biasing force F4 of the biasing chamber C4 because of the reference force F2. At this time, the fluid flows from the first chamber C1 to the second chamber C2 through the second passageway PW2. Specifically, as seen in FIG. 13, the fluid moves the valve element 48 to the second position P22 relative to the support member 22, causing the second grooves 56 and the second wall 70 to provide the retraction minimum cross-sectional area MC21 smaller than the first minimum cross-sectional area MC1 (FIG. 8). Thus, the second tube 14 is retracted relative to the first tube 12 at the second speed V22 that is lower than the first speeds V11 and V12.

The bicycle seatpost assembly 10 includes the following features.

(1) With the bicycle seatpost assembly 10, the positioning structure 16 is mounted to at least one of the first tube 12 and the second tube 14 to change the state of the bicycle seatpost assembly 10 among the first adjustable state and the second adjustable state. In the first adjustable state, the second tube 14 is retracted or extended relative to the first tube 12 at the first speed V11 or V12 in response to the reference force F1 or F2 applied to the second tube 14. In the second adjustable state, the second tube 14 is retracted or extended relative to the first tube 12 at the second speed V21 or V22 in response to the reference force F2 applied to the second tube 14. The second speed V21 and/or V22 is lower than the first speed V11 and/or V12. Accordingly, it is possible to change the speed of the second tube 14 in accordance with the state of the bicycle seatpost assembly 10, making it easier to adjust a position of the second tube 14 relative to the first tube 12. Furthermore, since the first speed V11 and/or V12 is higher than the second speed V21 and/or V22, the second tube 14 can be rapidly retracted or extended relative to the first tube 12 in the first adjustable state.

(2) The positioning structure 16 includes the first chamber C1, the second chamber C2, the first passageway PW1 to connect the first chamber C1 to the second chamber C2 in the first adjustable state, and the second passageway PW2 to connect the first chamber C1 to the second chamber C2 in the second adjustable state. Accordingly, it is possible to utilize the first passageway PW1 and the second passageway PW2 to change the state of the bicycle seatpost assembly 10.

(3) The positioning structure 16 closes the first passageway PW1 in the second adjustable state. Accordingly, it is possible to change the state of the bicycle seatpost assembly 10 to the second adjustable state by closing the first passageway PW1.

(4) The positioning structure 16 opens the second passageway PW2 in the first adjustable state. Accordingly, it is possible to change the state of the bicycle seatpost assembly 10 to the first adjustable state by opening the second passageway PW2.

(5) The first passageway PW1 has the first minimum cross-sectional area MC1 in the first adjustable state. The second passageway PW2 has the second minimum cross-sectional area MC2 in the second adjustable state. The second minimum cross-sectional area MC2 is smaller than the first minimum cross-sectional area MC1. Accordingly, it is possible to change the speed of the second tube 14 by switching the first passageway PW1 and the second passageway PW2.

(6) The positioning structure 16 includes the changing device 46 to change the second minimum cross-sectional area MC2 of the second passageway PW2 between the extension minimum cross-sectional area MC21 and the retraction minimum cross-sectional area MC22 in accordance with the direction of fluid flowing in the second passageway PW2. The extension minimum cross-sectional area MC21 is different from the retraction minimum cross-sectional area MC22. Accordingly, it is possible to change the speed of the second tube 14 in accordance with the direction of movement of the second tube 14 relative to the first tube 12.

(7) The changing device 46 changes the second minimum cross-sectional area MC2 of the second passageway PW2 to the retraction minimum cross-sectional area MC22 in the second adjustable state when the second tube 14 is retracted relative to the first tube 12. The changing device 46 changes the second minimum cross-sectional area MC2 of the second passageway PW2 to the extension minimum cross-sectional area MC21 in the second adjustable state when the second tube 14 is extended relative to the first tube 12. The retraction minimum cross-sectional area MC22 is smaller than the extension minimum cross-sectional area MC21. Accordingly, it is possible to make the speed of the second tube 14 lower when the second tube 14 is retracted relative to the first tube 12 than when the second tube 14 is extended relative to the first tube 12.

(8) The changing device 46 includes the support member 22 and the valve element 48. The valve element 48 is movable relative to the support member 22 in the telescopic direction D1 between the first position P21 and the second position P22 in response to the direction of fluid flowing in the second passageway PW2. The support member 22 and the valve element 48 defines the extension minimum cross-sectional area MC21 in a state where the valve element 48 is positioned at the first position P21 relative to the support member 22. The support member 22 and the valve element 48 defines the retraction minimum cross-sectional area MC22 in a state where the valve element 48 is positioned at the second position P22 relative to the support member 22. Accordingly, it is possible to change the state of the bicycle seatpost assembly 10 with a simple structure such as the valve element 48.

(9) The control member 26 is movable relative to the second tube 14 in the telescopic direction D1 between the first open position P11 and the second open position P12. The positioning structure 16 is in the first adjustable state in the first open state where the control member 26 is positioned at the first open position P11. The positioning structure 16 is in the second adjustable state in the second open state where the control member 26 is positioned at the second open position P12. Accordingly, it is possible to change the state of the bicycle seatpost assembly 10 with a simple structure such as the control member 26.

(10) The positioning structure 16 changes the closed state and the first open state of the first gate G1 in response to a position of the control member 26 relative to the second tube 14. The positioning structure 16 changes the closed state and the second open state of the second gate G2 in response to the position of the control member 26 relative to the second tube 14. Accordingly, it is possible to change the state of the bicycle seatpost assembly 10 with a simple structure such as the control member 26.

(11) The control member 26 is movably mounted to the second tube 14 to move relative to the second tube 14 in the telescopic direction D1 in response to the amount of operation of the control cable 3. Accordingly, it is possible to change the state of the bicycle seatpost assembly 10 with a simple structure such as the control member 26.

(12) The first tube 12 and the second tube 14 are relatively movable in the first adjustable state within the first adjustable range AR1. The first tube 12 and the second tube 14 are relatively movable in the second adjustable state within a second adjustable range AR2 equal to the first adjustable range AR1. Accordingly, it is possible to change the state of the bicycle seatpost assembly 10 within the same adjustable range in the first adjustable state and the second adjustable state.

(13) The positioning structure 16 is mounted to at least one of the first tube 12 and the second tube 14 to change the state of the bicycle seatpost assembly 10 among the first adjustable state and the second adjustable state. In the first adjustable state, the first chamber C1 is connected to the second chamber C2 via the first passageway PW1 having the first minimum cross-sectional area MC1. In the second adjustable state, the first chamber C1 is connected to the second chamber C2 via the second passageway PW2 having the second minimum cross-sectional area MC2 that is smaller than the first minimum cross-sectional area MC1. Accordingly, it is possible to change the cross-sectional area of a passageway in accordance with the state of the bicycle seatpost assembly 10. Thus, it is possible to change a speed of the second tube 14 in accordance with the state of the bicycle seatpost assembly 10, making it easier to adjust a position of the second tube 14 relative to the first tube 12.

(14) The changing device 46 is provided on the fluid passageway PW2 to change the minimum cross-sectional area MC2 of the fluid passageway PW2 between the retraction minimum cross-sectional area MC22 of when the second tube 14 is retracted relative to the first tube 12, and the extension minimum cross-sectional area MC21 of when the second tube 14 is extended relative to the first tube 12. The extension minimum cross-sectional area MC21 is different from the retraction minimum cross-sectional area MC22. Accordingly, it is possible to change the cross-sectional area of the fluid passageway PW2 in accordance with a relative position defined between the first tube 12 and the second tube 14. Thus, it is possible to change a speed of the second tube 14 in accordance with the state of the bicycle seatpost assembly 10, making it easier to adjust a position of the second tube 14 relative to the first tube 12.

Second Embodiment

A bicycle seatpost assembly 210 in accordance with a second embodiment will be described below referring to FIG. 17. The bicycle seatpost assembly 210 has substantially the same structures as those of the bicycle seatpost assembly 10 except for the actuation structure 17. Thus, elements having substantially the same function as those in the first embodiment will be numbered the same here, and will not be described and/or illustrated again in detail here for the sake of brevity.

Figure 17:
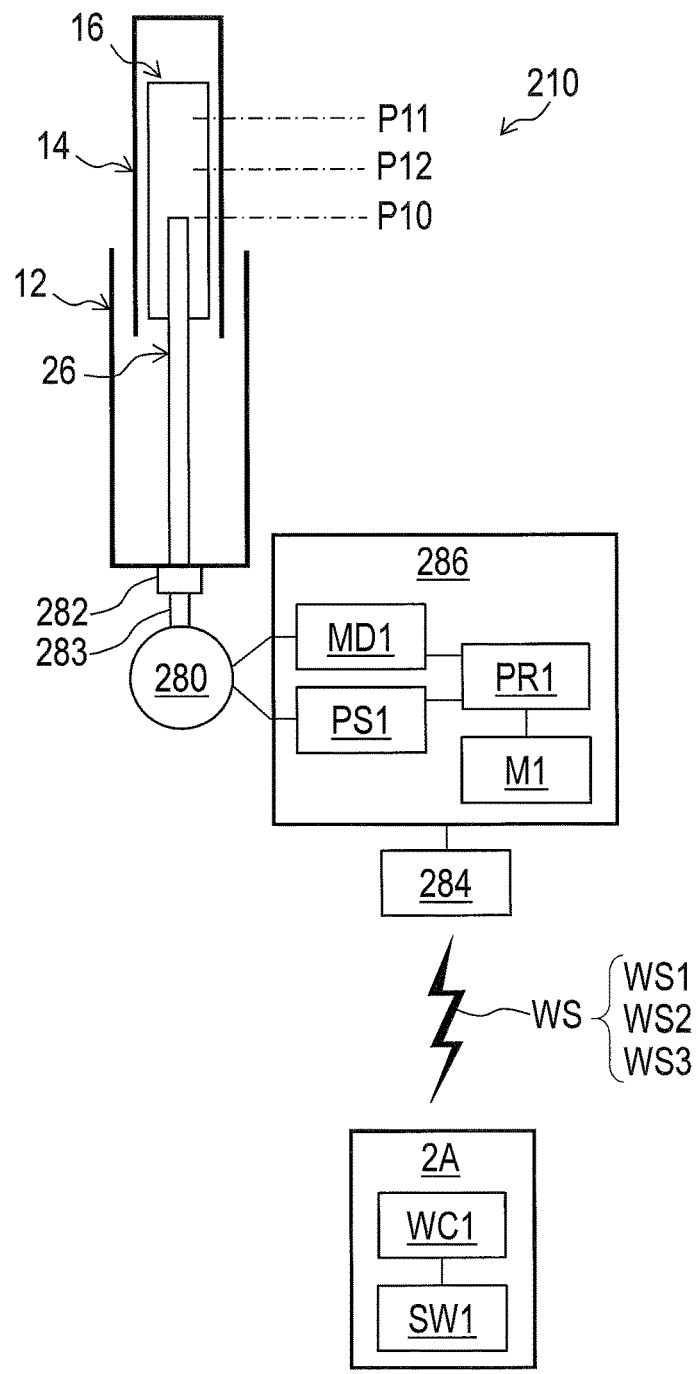
FIG. 17 is a schematic block diagram of a bicycle seatpost assembly in accordance with a second embodiment.

As seen in FIG. 17, the bicycle seatpost assembly 210 further comprises a motor 280 to move the control member 26 relative to the second tube 14 in the telescopic direction D1. The actuation structure 17 is omitted from the bicycle seatpost assembly 210. The control member 26 is operatively coupled to the motor 280. In this embodiment, the motor 280 changes the state of the bicycle seatpost assembly 210 among the locked state, the first adjustable state, and the second adjustable state. The motor 280 moves the control member 26 relative to the first tube 12 in the telescopic direction D1 between the closed position P10 and the first open position P11 through the second open position P12.

The bicycle seatpost assembly 210 further comprises a speed reducer 282 to convert rotation of a rotor 283 of the motor 280 into linear motion of the control member 26. The rotor 283 of the motor 280 is coupled to the control member 26 via the speed reducer 282.

The bicycle seatpost assembly 210 further comprises a wireless communication device 284 to receive a wireless signal WS. The bicycle seatpost assembly 210 further comprises a motor controller 286 to control the motor 280 in response to the wireless signal WS.

The motor controller 286 is electrically connected to the motor 280 and the wireless communication device 284. The motor controller 286 controls the motor 280 to move the control member 26 relative to the first tube 12 in the telescopic direction D1 in response to the wireless signal WS.

The motor controller 286 includes a processor PR1, a memory M1, a position sensor PS1, and a motor driver MD1. The processor PR1 is electrically connected to the memory M1. The processor PR1 includes a central processing unit (CPU). The memory M1 stores programs and other information. The memory M1 includes a read only memory (ROM), a random access memory (RAM), and a memory controller. For example, a program stored in the memory M1 is read into the processor PR1, and thereby several functions of the motor controller 286 are performed.

To determine a current state of the positioning structure 16, the position sensor PS1 senses a current position of the control member 26 relative to the first tube 12 via the motor 280. Examples of the position sensor PS1 include a contact rotational position sensor such as a potentiometer, and a non-contact rotational position sensor such as an optical sensor (e.g., a rotary encoder) and a magnetic sensor (e.g., a hall sensor). The current position of the motor 280 is stored in the memory M1. The processor PR1 generates a control signal based on a signal of the switch SW1 and the current position of the motor 280.

The motor driver MD1 controls the motor 280 based on the control signal generated by the processor PR1. In this embodiment, the motor driver MD1 controls a rotational direction and/or a rotational speed of an output shaft of the motor 280 based on the control signal generated by the processor PR1.

An operating device 2A includes a switch SW1 and an additional wireless communication device WC1. In this embodiment, the switch SW1 includes a three-position switch having three positions corresponding to the closed position P10, the first open position P11, and the second open position P12 of the control member 26. The wireless communication device WC1 generates the wireless signal WS based on operation of the switch SW1. The wireless communication device WC1 generates a first position signal WS1, a second position signal WS2, and a third position signal WS3 based on an operated position of the switch SW1. The first position signal WS1 corresponds to the closed position P10. The second position signal WS2 corresponds to the first open position P11. The third position signal WS3 corresponds to the second open position P12. The wireless communication device WC1 wirelessly transmits the first position signal WS1, the second position signal WS2, and the third position signal WS3 as the wireless signal WS.

The wireless communication device 284 wirelessly receives the first position signal WS1, the second position signal WS2, and the third position signal WS3 as the wireless signal WS. The motor controller 286 controls the motor 280 to position the control member 26 at the closed position P10 in response to the first position signal WS1. The motor controller 286 controls the motor 280 to position the control member 26 at the first open position P11 in response to the second position signal WS2. The motor controller 286 controls the motor 280 to position the control member 26 at the second open position P12 in response to the third position signal WS3.

The wireless communication device 284 can be omitted from the bicycle seatpost assembly 210. In such an embodiment, the motor controller 286 is electrically connected to the operating device 2A via an electric control cable.

With the bicycle seatpost assembly 210, it is possible to obtain substantially the same effects as those of the bicycle seatpost assembly 10 in accordance with the first embodiment.

Furthermore, the bicycle seatpost assembly 210 includes the following features.

(1) The bicycle seatpost assembly 210 further comprises the motor 280 to move the control member 26 relative to the second tube 14 in the telescopic direction D1. Accordingly, it is possible to change the state of the bicycle seatpost assembly 10 using electric power.

(2) The bicycle seatpost assembly 210 further comprises the wireless communication device 284 to receive the wireless signal WS, and the motor controller 286 to control the motor 280 in response to the wireless signal WS. Accordingly, it is possible to change the state of the bicycle seatpost assembly 10 using wireless technology.

It will be apparent to those skilled in the bicycle field from the present disclosure that the structures and/or configurations of the above embodiments can be at least partly combined with each other.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body", and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle seatpost assembly comprising:
a first tube;
a second tube mounted to the first tube to be retracted and extended relative to the first tube in a telescopic direction; and
a positioning structure to relatively position the first tube and the second tube, the positioning structure being mounted to at least one of the first tube and the second tube and configured to change a state of the bicycle seatpost assembly among
a first adjustable state in which the second tube is retracted or extended relative to the first tube at a first speed in response to a reference force applied to the second tube, and
a second adjustable state in which the second tube is retracted or extended relative to the first tube at a second speed in response to the reference force applied to the second tube, the second speed being lower than the first speed,
wherein the positioning structure includes a first chamber, a second chamber, a first passageway connecting the first chamber to the second chamber in the first adjustable state, and a second passageway to connect the first chamber to the second chamber in the second adjustable state.

2. The bicycle seatpost assembly according to claim 1, wherein
the positioning structure closes the first passageway in the second adjustable state.

3. The bicycle seatpost assembly according to claim 1, wherein
the positioning structure opens the second passageway in the first adjustable state.

4. The bicycle seatpost assembly according to claim 1, wherein
the first passageway has a first minimum cross-sectional area in the first adjustable state,
the second passageway has a second minimum cross-sectional area in the second adjustable state, and
the second minimum cross-sectional area is smaller than the first minimum cross-sectional area.

5. The bicycle seatpost assembly according to claim 4, wherein
the positioning structure includes a changing device to change the second minimum cross-sectional area of the second passageway between an extension minimum cross-sectional area and a retraction minimum cross-sectional area in accordance with a direction of fluid flowing in the second passageway, and
the extension minimum cross-sectional area is different from the retraction minimum cross-sectional area.

6. The bicycle seatpost assembly according to claim 5, wherein
the changing device changes the second minimum cross-sectional area of the second passageway to the retraction minimum cross-sectional area in the second adjustable state when the second tube is retracted relative to the first tube,
the changing device changes the second minimum cross-sectional area of the second passageway to the extension minimum cross-sectional area in the second adjustable state when the second tube is extended relative to the first tube, and
the retraction minimum cross-sectional area is smaller than the extension minimum cross-sectional area.

7. The bicycle seatpost assembly according to claim 5, wherein
the changing device includes
a support member, and
a valve element movable relative to the support member in the telescopic direction between a first position and a second position in response to the direction of fluid flowing in the second passageway,
the support member and the valve element defines the extension minimum cross-sectional area in a state where the valve element is positioned at the first position relative to the support member, and
the support member and the valve element defines the retraction minimum cross-sectional area in a state where the valve element is positioned at the second position relative to the support member.

8. The bicycle seatpost assembly according to claim 1, wherein
the positioning structure includes a control member movable relative to the second tube in the telescopic direction between a first open position and a second open position,
the positioning structure is in the first adjustable state in a first open state where the control member is positioned at the first open position, and
the positioning structure is in the second adjustable state in a second open state where the control member is positioned at the second open position.

9. The bicycle seatpost assembly according to claim 8, wherein
the positioning structure includes
a first gate provided on the first passageway, the first gate having a first closed state and a first open state, and
a second gate provided on the second passageway, the second gate having a second closed state and a second open state, the positioning structure changes a state of the first gate between the first closed state and the first open state in response to a position of the control member relative to the second tube, and the positioning structure changes a state of the second gate between the second closed state and the second open state in response to the position of the control member relative to the second tube.

10. The bicycle seatpost assembly according to claim 8, wherein the control member is movably mounted to the second tube to move relative to the second tube in the telescopic direction in response to an amount of operation of a control cable.

11. The bicycle seatpost assembly according to claim 8, further comprising:

a motor to move the control member relative to the second tube in the telescopic direction.

12. The bicycle seatpost assembly according to claim 11, further comprising:

a wireless communication device to receive a wireless signal; and a motor controller to control the motor in response to the wireless signal.

13. The bicycle seatpost assembly according to claim 1, wherein the first tube and the second tube are relatively movable in the first adjustable state within a first adjustable range, and the first tube and the second tube are relatively movable in the second adjustable state within a second adjustable range equal to the first adjustable range.

14. A bicycle seatpost assembly comprising:

a first tube;

a second tube mounted to the first tube to be retracted and extended relative to the first tube in a telescopic direction; and a positioning structure to relatively position the first tube and the second tube, the positioning structure including a first chamber and a second chamber, the positioning structure being mounted to at least one of the first tube and the second tube and configured to change a state of the bicycle seatpost assembly among a first adjustable state in which the first chamber is connected to the second chamber via a first passageway having a first minimum cross-sectional area, and a second adjustable state in which the first chamber is connected to the second chamber via a second passageway having a second minimum cross-sectional area that is smaller than the first minimum cross-sectional area.

15. The bicycle seatpost assembly according to claim 14, wherein the positioning structure includes a changing device to change the second minimum cross-sectional area of the second passageway between an extension minimum cross-sectional area and a retraction minimum cross-sectional area in accordance with a direction of fluid flowing in the second passageway, and the extension minimum cross-sectional area is different from the retraction minimum cross-sectional area.

16. The bicycle seatpost assembly according to claim 15, wherein the changing device changes the second minimum cross-sectional area of the second passageway to the retraction minimum cross-sectional area in the second adjustable state when the second tube is retracted relative to the first tube, the changing device changes the second minimum cross-sectional area of the second passageway to the extension minimum cross-sectional area in the second adjustable state when the second tube is extended relative to the first tube, and the retraction minimum cross-sectional area is smaller than the extension minimum cross-sectional area.

17. The bicycle seatpost assembly according to claim 15, wherein the changing device includes a support member, and a valve element movable relative to the support member in the telescopic direction between a first position and a second position in response to the direction of fluid flowing in the second passageway, the support member and the valve element defines the extension minimum cross-sectional area in a state where the valve element is positioned at the first position relative to the support member, and the support member and the valve element defines the retraction minimum cross-sectional area in a state where the valve element is positioned at the second position relative to the support member.

18. A bicycle seatpost assembly comprising:

a first tube;

a second tube mounted to the first tube to be retracted and extended relative to the first tube in a telescopic direction; and a positioning structure to relatively position the first tube and the second tube, the positioning structure including a first chamber, a second chamber, a fluid passageway to connect the first chamber to the second chamber, and a changing device provided on the fluid passageway to change a minimum cross-sectional area of the fluid passageway between a retraction minimum cross-sectional area of when the second tube is retracted relative to the first tube, and an extension minimum cross-sectional area of when the second tube is extended relative to the first tube, the extension minimum cross-sectional area being different from the retraction minimum cross-sectional area.

19. The bicycle seatpost assembly according to claim 18, wherein the retraction minimum cross-sectional area is smaller than the extension minimum cross-sectional area.

20. The bicycle seatpost assembly according to claim 18, wherein the changing device includes a support member, and a valve element movable relative to the support member in the telescopic direction between a first position and a second position in response to the direction of fluid flowing in the second passageway, the support member and the valve element defines the extension minimum cross-sectional area in a state where the valve element is positioned at the first position relative to the support member, and the support member and the valve element defines the retraction minimum cross-sectional area in a state where the valve element is positioned at the second position relative to the support member.

\* \* \* \* \*